US011443004B1

(12) United States Patent
Brody et al.

(10) Patent No.: US 11,443,004 B1
(45) Date of Patent: Sep. 13, 2022

(54) DATA EXTRACTION AND OPTIMIZATION USING ARTIFICIAL INTELLIGENCE MODELS

(71) Applicant: FOUNDRYDC, LLC, Washington, DC (US)

(72) Inventors: Ned Brody, Washington, DC (US); James Manzi, Washington, DC (US)

(73) Assignee: FOUNDRYDC, LLC, Washington, DC (US)

( * ) Notice: Subject to any disclaimer, the term of this patent is extended or adjusted under 35 U.S.C. 154(b) by 288 days.

(21) Appl. No.: 16/732,916

(22) Filed: Jan. 2, 2020

Related U.S. Application Data

(60) Provisional application No. 62/787,687, filed on Jan. 2, 2019.

(51) Int. Cl.
*G06F 16/9538* (2019.01)
*G06N 20/00* (2019.01)
*G06F 16/958* (2019.01)

(52) U.S. Cl.
CPC ........ *G06F 16/9538* (2019.01); *G06F 16/958* (2019.01); *G06N 20/00* (2019.01)

(58) Field of Classification Search
CPC .... G06F 16/9538; G06F 16/958; G06N 20/00
See application file for complete search history.

(56) References Cited

U.S. PATENT DOCUMENTS

| 7,769,751 | B1 * | 8/2010 | Wu | G06F 16/335 707/728 |
| 8,751,466 | B1 * | 6/2014 | Tsay | G06F 16/951 707/700 |
| 8,856,937 | B1 * | 10/2014 | Wuest | H04L 63/1483 726/26 |
| 2002/0150300 | A1 * | 10/2002 | Lee | G06K 9/72 382/229 |
| 2006/0230012 | A1 * | 10/2006 | Ruvolo | G06F 16/337 |
| 2008/0270209 | A1 * | 10/2008 | Mauseth | G06Q 10/10 705/7.29 |

(Continued)

OTHER PUBLICATIONS

Wikipedia, Neural network, accessed Dec. 7, 2021 at https://en.wikipedia.org/w/index.php?title=Neural_network&oldid=1054034384 (Year: 2021).*

*Primary Examiner* — Albert M Phillips, III
(74) *Attorney, Agent, or Firm* — Foley & Lardner LLP

(57) ABSTRACT

Disclosed herein are embodiments of systems, methods, and products comprises a server, which identifies optimized potential suppliers based on the client's request. The request comprises search specification and preselected bidders. The server extracts a first set of keywords from the search specification and finds web pages of potential suppliers based on the first set of keywords. The server identifies the websites of the preselected bidders, extracts a second set of keywords from the websites, and finds web pages of more potential suppliers based on the second set of keywords. The server determines the web pages are associated with real suppliers by excluding non-supplier web pages. The server determines a similarity score for each potential supplier by vectorizing keywords extracted from the supplier's web pages. The server determines a risk score for each potential supplier. The server generates a GUI comprising a list of suppliers ranked based on the similarity scores.

20 Claims, 21 Drawing Sheets

(56) References Cited

U.S. PATENT DOCUMENTS

| | | | | |
|---|---|---|---|---|
| 2010/0161641 A1* | 6/2010 | Gustafson | ............ | G06F 16/3338 |
| | | | | 707/759 |
| 2010/0316300 A1* | 12/2010 | Epshtein | ................ | H04N 7/165 |
| | | | | 382/229 |
| 2011/0178995 A1* | 7/2011 | Suchter | ................ | G06F 16/951 |
| | | | | 707/692 |
| 2012/0117043 A1* | 5/2012 | Radlinski | .............. | G06F 16/338 |
| | | | | 707/706 |
| 2012/0117082 A1* | 5/2012 | Koperda | .......... | G06F 16/24578 |
| | | | | 707/748 |
| 2012/0136885 A1* | 5/2012 | Zhou | .................... | G06F 16/951 |
| | | | | 707/765 |
| 2013/0173562 A1* | 7/2013 | Alspector | ................ | G06F 16/35 |
| | | | | 707/692 |
| 2013/0282627 A1* | 10/2013 | Faddoul | ................. | H04L 51/12 |
| | | | | 706/12 |
| 2014/0279078 A1* | 9/2014 | Nukala | ............. | G06Q 30/0276 |
| | | | | 705/14.73 |
| 2015/0128272 A1* | 5/2015 | Chen | .................. | H04L 63/1483 |
| | | | | 726/23 |
| 2016/0239572 A1* | 8/2016 | Gutierrez Munoz | ........................ | |
| | | | | G06F 16/24578 |
| 2016/0350822 A1* | 12/2016 | Ganesan | ............ | G06Q 30/0605 |
| 2017/0270100 A1* | 9/2017 | Audhkhasi | ............ | G06F 40/289 |
| 2017/0286401 A1* | 10/2017 | He | ....................... | G06N 3/0454 |
| 2019/0171767 A1* | 6/2019 | Bolla | .................... | G06N 20/00 |
| 2020/0036751 A1* | 1/2020 | Kohavi | ............... | H04L 63/1425 |

\* cited by examiner

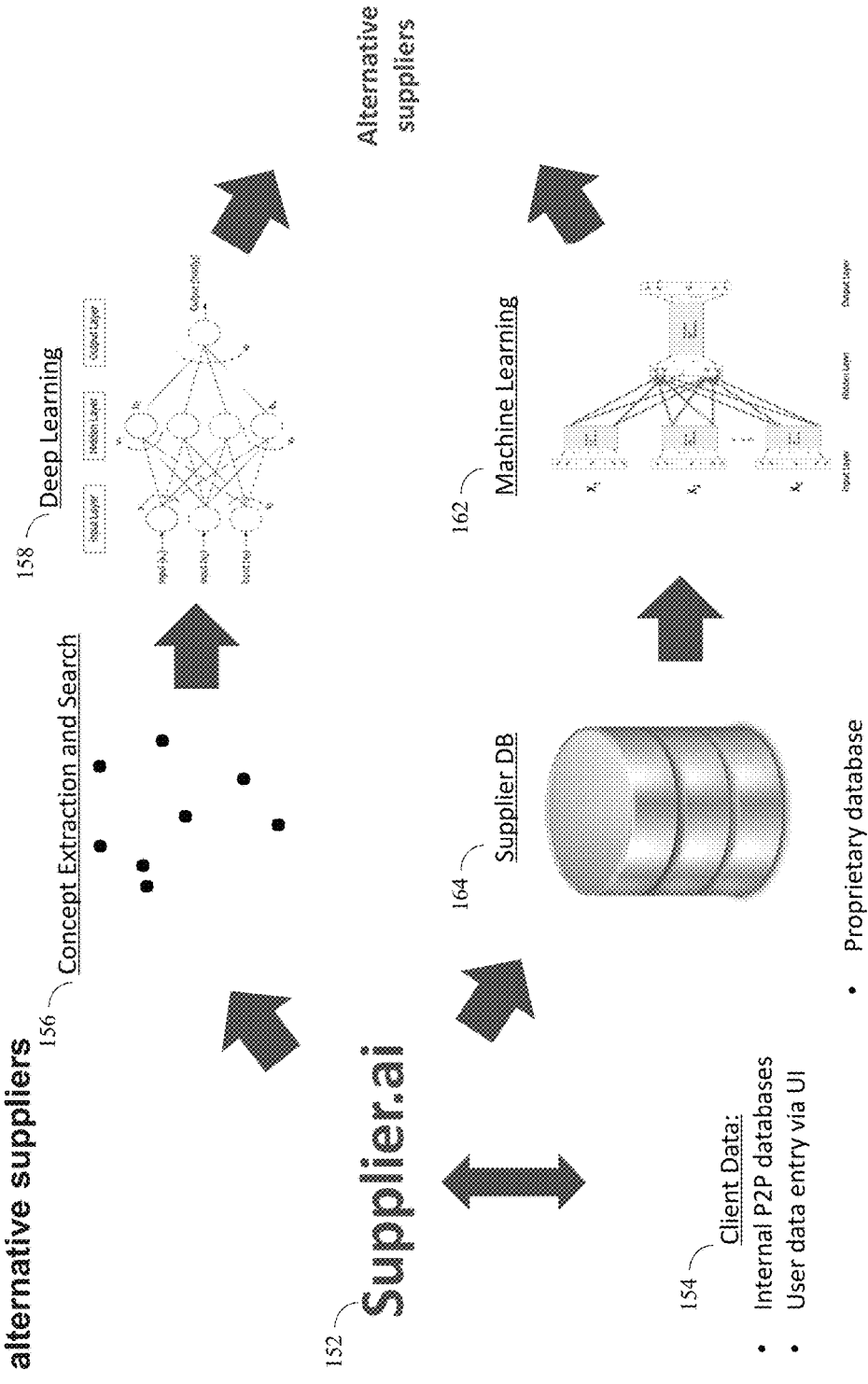

Supplier.ai | View prior searches | Q New search | Company lookup | Logout

410

1 Setup    2 Details

Confirm pre-selected bidders:

Please make sure we have found the correct website for your bidders below.
If a bidder doesn't have a website, leave it blank. How are we doing this

| Company Name | Domain | Link |
|---|---|---|
| Rhodia Solvay | solvay.com | ☑ |
| BASF | BASF.com | ☑ |
| Union Chemical | UnionChemical.com | ☑ |
| Wellgo Chem | WellgoChem.com | ☑ |
| VVF LLC | vvflc.com | ☑ |
| Panjiva | Panjiva.com | ☑ |
| ACME Synthetic | ACMESynthetic.com | ☑ |
| Parchem | Parchem.com | ☑ |
| Surfachem | Surfachem.com | ☑ |
| Dow Chemical | DowChemical.com | ☑ |

412 — Company Name   414 — Domain   416 — Link

Add another pre-selected bidder

Back

DATA EXTRACTION AND OPTIMIZATION USING ARTIFICIAL INTELLIGENCE MODELS

CROSS-REFERENCE TO RELATED APPLICATIONS

This application claims priority to U.S. Provisional Patent Application Ser. No. 62/787,687, entitled "Data Extraction and Optimization Using Artificial Intelligence Models," filed Jan. 2, 2019, which is fully incorporated herein by reference in its entirety.

TECHNICAL FIELD

This application relates generally to methods and systems for generating, implementing, and executing multiple artificial intelligence models.

BACKGROUND

To search for service suppliers meeting certain needs is not an easy task. A common way to do the searching may be searching keywords in a search engine. However, the search engine may return numerous results, which may be a mix of web pages, images, and other types of files. The returned results may include noise information and not accurate. To go through each result may be time consuming. In addition, the conventional keyword searching methods may not be able to distinguish the quality of the potential supplier. For example, some service suppliers with negative news may not be qualified; however, the keyword searching method may not be able to determine the news is negative.

As a result, in the existing and conventional methods, there is no guarantee that the returned results are service suppliers satisfying the users' needs, and there is no mechanism to filter out poor suppliers with negative news. In addition, it may require a large amount of time and efforts for a user to further go through the numerous results and do further searching to determine the qualification of the service supplier in each result.

SUMMARY

For the aforementioned reasons, there is a need for a more accurate and efficient system and method that would minimize the time and effort required for identifying high quality service suppliers satisfying users' needs. Disclosed herein are systems and methods for receiving user input specification and preselected suppliers/bidders, identifying the web address (e.g., Uniform Resource Locator, URL) of the preselected bidders, extracting a first set of keywords from the user input specification and searching the extracted first set of keywords to find web pages for a first set of potential suppliers; extracting a second set of keywords from the web pages of the URL of the preselected bidders by web crawling the web pages and searching the second set of keywords to find similar web pages for a second set of potential suppliers; determining a similarity score between the specification and the web pages for each of the first set of potential supplier and a similarity score between the web pages of the preselected bidders and the web pages of the second set of potential suppliers; displaying the potential suppliers in a graphical user interface (GUI) based on the ranking of the similarity scores. The GUI may also include a risk assessment component that analyzes negative news for each potential supplier and determines a risk score.

The service suppliers are used as an illustrative example in this disclosure. The methods and systems described herein are applicable for searching and identifying any other entities requested by a user.

In one embodiment, a computer-implemented method comprises retrieving, by a server, a set of web documents in response to a plurality of search attribute inputs; generating, by the server, a set of vectors representing n-gram values corresponding to a plurality of terms within each web document; executing, by the server, a first artificial intelligence model configured to receive the set of vectors for each web document and generate an importance score for each web document; executing, by the server, a second artificial intelligence model configured to: receive a first set of vectors corresponding to a first subset of the set of web documents satisfying the importance value threshold and generate a similarity score associated with each web document within the first subset of the set of web documents; selecting, by the server, a second subset of the set of web documents satisfying a similarity score threshold; selecting, by the server, a third subset of the set of web documents satisfying a pre-determined blacklisting criteria; generating, by the server, a graphical user interface configured to present a listing of each web document within the third subset of the set of web documents; and upon receiving a selection on the graphical user interface, generating, by the server, an electronic message directed to an address associated with at least one search attribute and containing a predetermined text string.

In another embodiment, a computer-implemented method comprises retrieving, by a server, a set of web documents in response to a plurality of search attributes input on a graphical user interface, wherein each web document within the set of web documents comprises at least one text string corresponding to at least one search attribute; extracting, by the server, a set of terms from each web document; generating, by the server, a set of vectors representing an n-gram value corresponding to a plurality of terms within the set of terms; executing, by the server, a first artificial intelligence model configured to receive the set of vectors for each web document and generate an importance score associated with each web document; executing, by the server, a second artificial intelligence model configured to: receive a first set of vectors corresponding to a first subset of the set of web documents satisfying an importance score threshold, and generate a similarity score associated with each web document within the first subset of the set of web documents; executing, by the server, a blacklisting protocol configured to receive a second subset of the set of web documents that satisfy a similarity score threshold, and determine whether the second subset of the set of web documents satisfy a pre-determined blacklisting criteria; identifying, by the server, a third subset of web documents based upon a combined value from the importance score, the similarity score, and the pre-determined blacklisting criteria; generating, by the server, a second graphical user interface configured to present a listing of each web document within the third subset of the set of web documents; and upon receiving a selection on the second graphical user interface, generating, by the server, an electronic message directed to an address associated with at least one search attribute and containing a predetermined text string.

In another embodiment, a computer-implemented method comprises upon receiving an input of a plurality of search attributes, generating, by a server, an importance score of each web document responsive to the input; generating, by the server, a similarity score of each web document responsive to the input; generating, by the server, a graphical user interface configured to present a listing of each web document having an importance score and similarity score exceeding a threshold; and upon receiving a selection on the graphical user interface, generating, by the server, an electronic message directed to an address associated with at least one search attribute and containing a predetermined text string.

In another embodiment, a computer system comprises a client device configured to display at least one graphical user interface generated by a server; and a server in communication with the client device, the server configured to retrieve a set of web documents in response to a plurality of search attributes input on a graphical user interface displayed on the client device, wherein each web document within the set of web documents comprises at least one text string corresponding to at least one search attribute; extract a set of terms from each web document; generate a set of vectors representing an n-gram value corresponding to a plurality of terms within the set of terms; execute a first artificial intelligence model configured to receive the set of vectors for each web document and generate an importance score associated with each web document; execute a second artificial intelligence model configured to receive a first set of vectors corresponding to a first subset of the set of web documents satisfying an importance score threshold, and generate a similarity score associated with each web document within the first subset of the set of web documents; execute a blacklisting protocol configured to receive a second subset of the set of web documents that satisfy a similarity score threshold, and determine whether the second subset of the set of web documents satisfy a pre-determined blacklisting criteria; identify a third subset of web documents based upon a combined value from the importance score, the similarity score, and the pre-determined blacklisting criteria; generate a second graphical user interface configured to present a listing of each web document within the third subset of the set of web documents; and upon receiving a selection on the second graphical user interface, generate an electronic message directed to an address associated with at least one search attribute and containing a predetermined text string.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

FIG. 1B illustrates an example of method components of selecting one or more optimized service suppliers, according to an embodiment.

FIG. 3B illustrates an example of a graphical user interface for the client to copy and paste a local document into the search specification interface, according to an embodiment.

FIG. 3C illustrates an example of a graphical user interface for the client to copy and paste a local document in a different language into the search specification interface, according to an embodiment.

FIG. 4A illustrates an example of a graphical user interface for the client to input preselected bidders, according to an embodiment.

FIG. 4B illustrates an example of a graphical user interface for the client to confirm preselected bidders, according to an embodiment.

FIG. 5 illustrates an example of a graphical user interface for displaying potential suppliers, according to an embodiment.

FIG. 8B illustrates an example of a graphical user interface for displaying prior work of a potential supplier, according to an embodiment.

FIG. 8E illustrates an example of a graphical user interface for displaying the financials of a potential supplier, according to an embodiment.

FIG. 9A illustrates an example of a graphical user interface for the client to interact with risk assessment component of a particular potential supplier, according to an embodiment.

FIG. 10 illustrates an example of a graphical user interface for the client to interact with contact supplier component of a particular potential supplier, according to an embodiment.

DETAILED DESCRIPTION

Figure 1A:
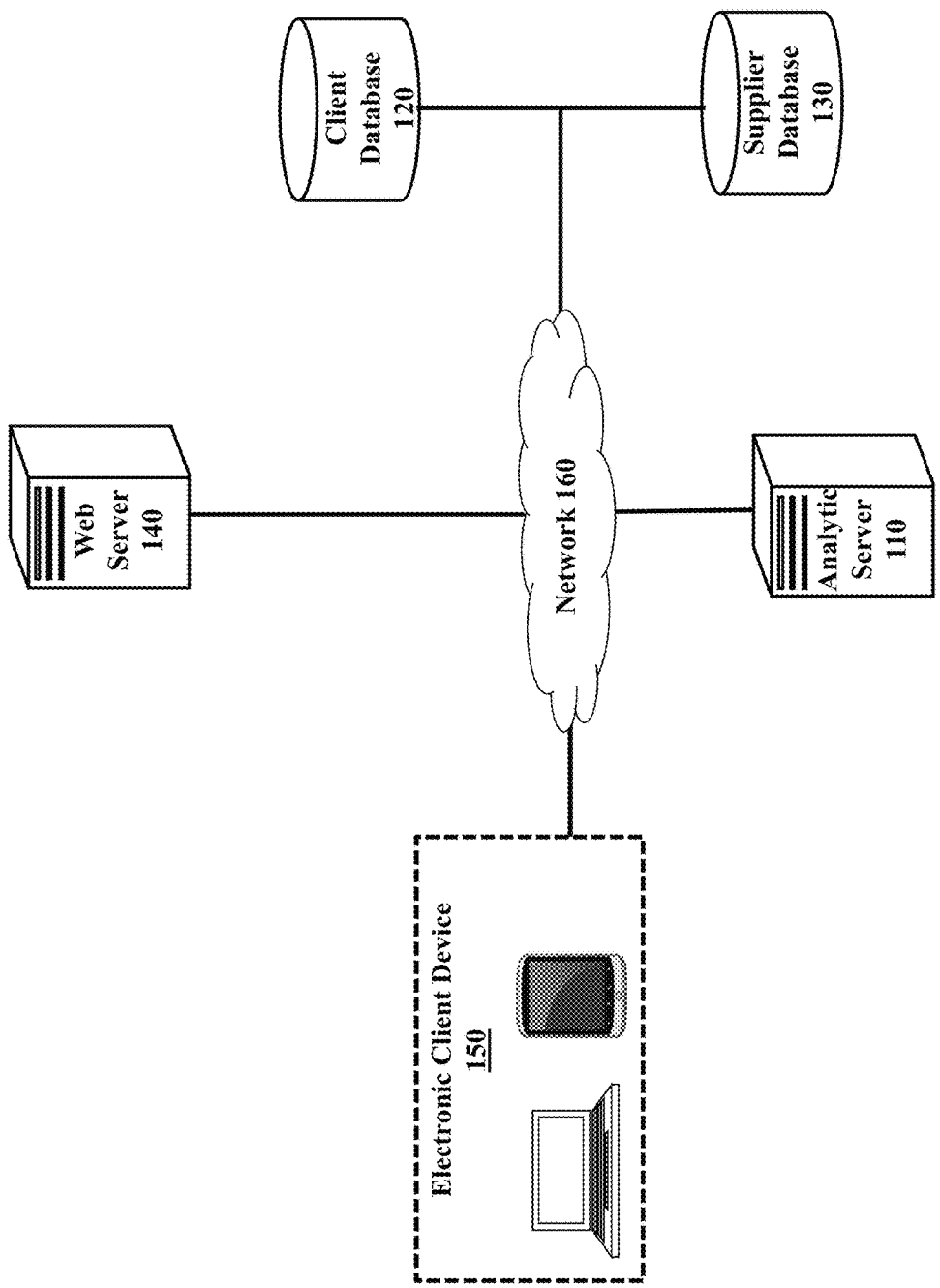
FIG. 1A illustrates a computer system for selecting one or more optimized service suppliers, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1A illustrates components of an exemplary system 100A for selecting one or more optimized service suppliers, according to an embodiment. The exemplary system 100A may comprise an analytic server 110, a client database 120, a supplier database 130, a web server 140, and an electronic client device 150 that are connected with each other via hardware and software components of one or more networks 160. Examples of the network 160 include, but are not limited to, Local Area Network (LAN), Wireless Local Area Network (WLAN), Metropolitan Area Network (MAN), Wide Area Network (WAN), and the Internet. The communication over the network 160 may be performed in accordance with various communication protocols, such as Transmission Control Protocol and Internet Protocol (TCP/IP), User Datagram Protocol (UDP), and IEEE communication protocols.

The electronic client device 150 may be any computing device allowing a user/client to interact with analytic server 110. The electronic client device 150 may be any computing device comprising a processor and non-transitory machine-readable storage medium allowing the electronic client device 150 to perform the various tasks and processes described herein. The examples of the computing device may include, but are not limited to, a desktop computer, a laptop, a personal digital assistant (PDA), a smartphone, a tablet computer, and the like.

The electronic client device 150 may execute an Internet browser or local application that accesses the analytic server 110 in order to issue requests or instructions. The electronic client device 150 may transmit credentials from client inputs to the analytic server 110, from which the analytic server 110 may authenticate the client and/or determine a client role. The electronic client device 150 may comprise any number of input devices configured to receive any number of data inputs, including various types of data inputs allowing for authentication (e.g., username, passwords, certificates, and biometrics).

The electronic client device 150 may be configured to communicate with the analytic server 110 through one or more networks 160, using wired and/or wireless communication capabilities. In operation, the electronic client device 150 may execute an optimized supplier selection program, which may include a graphical user interface (GUI) that renders an interactive layout, schematic, or other elements for the client to input a request. For example, the user interface may include a text-based interface allowing the client to enter manual commands. The client may input search specification in the text-based interface. The search specification may include the information on requirements and needs for potential service suppliers. The client may simply copy and paste specification information from local documents. The search specification may be in any language. The analytic server may automatically translate the search specification in any language to the required language. Furthermore, the GUI may include interactive element (e.g., a dropdown menu) for the user to provide further information on geography and other filters. The GUI may also include an interactive element, such as a text-based interface, for the client to input preselected bidders. The client may input an identifier, such as a name or URL, of each preselected bidder. The preselected bidders may be existing suppliers that have contracts with the client or new suppliers the client is interested in.

An analytic server 110 may be any computing device comprising a processor and other computing hardware and software components, configured to process the requests received from the electronic client device 150. The analytic server 110 may be logically and physically organized within the same or different devices or structures, and may be distributed across any number of physical structures and locations (e.g., cabinets, rooms, buildings, cities). Upon the analytic server 110 receiving the request from the electronic client device 150 to select one or more optimized service suppliers, the analytic server 110 may execute one or more component software modules to access client database 120 to retrieve the procurement related data such as search specification. The analytic server 110 may also access the supplier database 130 to retrieve supplier data of existing suppliers that have contracts with the client or preselected bidders. The analytic server 110 may search the web server 140 using the keywords/terms extract from the search specification and web pages of existing suppliers and preselected bidders, and find more potential suppliers meeting the search specification or similar to identified suppliers.

In operation, the analytic server 110 may determine a similarity score for each potential supplier. The similarity score may be between each potential supplier's web pages and the client's specification, or between each potential supplier's web pages and the web pages of the preselected bidders/existing suppliers. The analytic server 110 may determine the similarity score by vectorizing the keywords from the search specification/preselected bidder web pages and the potential supplier web pages. The analytic server 110 may display the potential suppliers on a GUI of the electronic client device 150 ranked by the similarity scores. For example, the analytic server may generate a list of URL (e.g., homepage) of the potential suppliers. The analytic server 110 may also store the potential suppliers' data into the supplier database 130.

The client database 120 may be any non-transitory machine-readable media configured to store data. For example, the client database 120 may be a purchase order database that stores the P2P data that is product to purchase data, the search specification, the user identifier and attributes, the terms and keywords of the P2P data, vectorized keywords/terms, and any other user data provided by the client via the graphical user interface. The purchase order data stored in the client database 120 may include information that the client signed an agreement to pay a certain amount of money to a specific supplier on a certain date on certain terms for certain goods and services.

The supplier database 130 may be any non-transitory machine-readable media configured to store data. The supplier database 130 may store information of existing suppliers that have contracts with the client, preselected bidders, other potential suppliers identified by the analytic server, and vectorized keywords/terms associated with the preselected bidders and potential suppliers. The supplier database 130 may include information on the detailed, vectorized data on the suppliers, description of the suppliers, product categories, contract payment terms with the suppliers, invoicing address, and any other supplier data.

Before the analytic server vectorizing the keywords/terms and calculating the similarity score, the analytic server 110 may determine whether the web pages searched based on the keywords/terms are about real suppliers. There may be web pages including the keywords/terms, but not for a real supplier. For example, some web pages may be public standards for the legal rules for doing business of goods or services. Some web pages may from trade journals. Such web pages may include the keywords/terms and look a lot like a supplier. The analytic server 110 may distinguish supplier companies from non-supplier companies and determine the probability of the web pages being from a supplier using artificial intelligence model (e.g., using a neural network and building a regression model). To distinguish the supplier companies from non-supplier companies, the analytic server 110 may check the domain name of web address and do hard kills in a deterministic way. The analytic server 110 may also determine the probability of web pages being from a supplier by using the neural network, which is the general neural network of importance. Furthermore, the analytic server 110 may train a second neural network to determine if the web pages are from trade journals. The second neural network may kill false information the hard kills do not recognize based on the domain name.

After the analytic server 110 determines the potential suppliers, the analytic server 110 may perform risk analysis to determine a risk score for each potential supplier. Specifically, the analytic server 110 may find news/articles by searching the company name of each potential supplier, and determine negative news by training a neural network. The analytic server may determine a risk score based on the negative news.

The web server 140, also called an HTTP server, may be any computing device comprising a processor and other computing hardware and software components, configured to host content, such as a website. A website is a collection of related web pages, including multimedia content, typically identified with a common domain name, and published on at least one web server. A website may be accessible via one or more networks 160 including a public Internet Protocol (IP) network, such as the Internet, or a private local area network (LAN). The web server 140 may also comprise software that runs on the computing device that retrieves and delivers the web pages in response to requests from the analytic server 110. Web pages are documents, typically composed in plain text interspersed with formatting instructions of Hyper Text Markup Language (HTML, XHTML). Web pages from one website may incorporate elements from other websites with suitable markup anchors. The web server 140 may transport the web pages with Hypertext Transfer Protocol (HTTP), which may optionally employ encryption (HTTP Secure, HTTPS) to provide security and privacy for the user. Web pages can be viewed or otherwise accessed from a range of computer-based and Internet-enabled electronic devices of various sizes, including desktop computers, laptops, PDAs and cell phones.

The analytic server 110 may access the web server 140 of each potential supplier based on the corresponding URL and web crawl contents or texts from web pages hosted in web server 140. Based on the web page texts, the analytic server 110 may perform vectorization and calculate similarity score. In addition, the analytic server 110 may web crawl the news/articles from different web servers 140 based on the company name of each potential supplier, and perform risk analysis based on the news/articles.

FIG. 1B illustrates method components of selecting one or more optimized service suppliers 100B, according to an embodiment. The analytic server may run the artificial intelligence model for selecting optimized suppliers (supplier.ai) 152. After the analytic server receiving a request from the client, the analytic server may retrieve the client data from internal client database that stores P2P data (product to purchase data); the analytic server may also extract client data based on the user entries in the user interface 154. The user entries in the user interface may comprise search specification and preselected bidders. Based on the client data, the analytic server may go through two paths to identify potential suppliers. In the first path, the analytic server may perform concept extract and search 156 to determine key words/terms from the search specification and web pages of preselected bidders. The analytic server may search the keywords/terms and find potential suppliers meeting the search specification or similar to identified suppliers using deep learning methods 158. In the second path, the analytic server may retrieve supplier database 164 that stores information of existing suppliers having contracts with the client, preselected bidders, other potential suppliers identified by the analytic server, and vectorized keywords/terms associated with the preselected bidders and potential suppliers. The analytic server may access the supplier database to retrieve supplier data of existing suppliers having contracts with the client and/or preselected bidders. Based on the supplier data, the analytic server may find more potential suppliers similar to the existing suppliers and/or preselected bidders using machine learning 162.

In some configurations, the deep learning methods 158 and/or machine learning 162 may include one or more long short term memory (LSTM) networks. LSTM networks are building units for layers of a recurrent neural network (RNN). A common LSTM unit is composed of a cell, an input gate, an output gate and a forget gate. The cell is responsible for "remembering" values over arbitrary time intervals. Each of the gates can be thought of as a "conventional" artificial neuron, as in a multi-layer (or feedforward) neural network: that is, they compute an activation (using an activation function) of a weighted sum. The gates can also be analogous to regulators of the flow of values that go through the connections of the LSTM. The forget gate controls the extent to which a value remains in the cell and the output gate controls the extent to which the value in the cell is used to compute the output activation of the LSTM unit. The expression long short-term refers to the fact that LSTM is a model for the short-term memory, which can last for a long period of time. An LSTM is well-suited to classify, process and predict time series given time lags of unknown size and duration between important events.

Figure 2A:
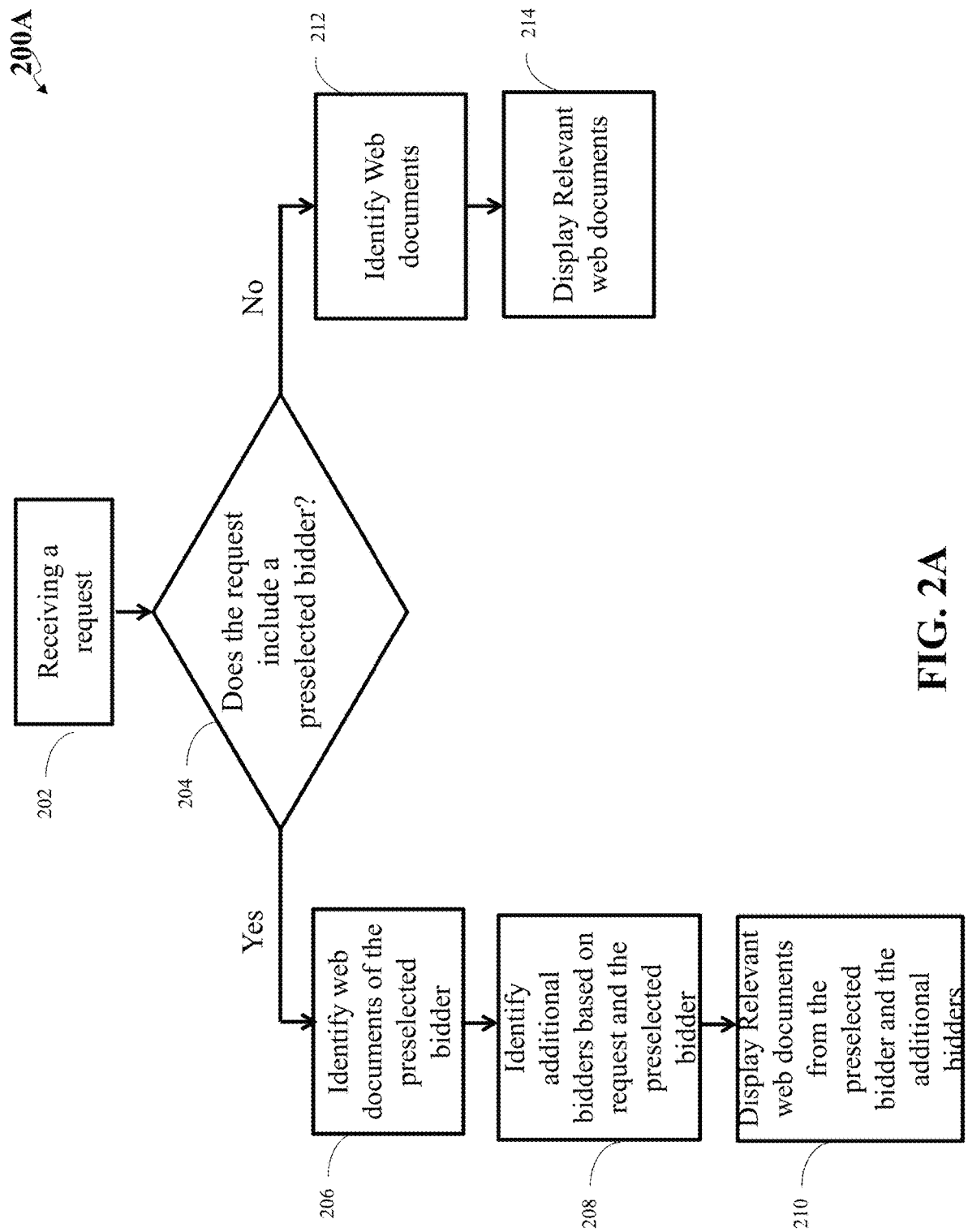
FIG. 2A illustrates a flowchart depicting operational steps for identifying one or more optimized service suppliers based on two paths, according to an embodiment.

FIG. 2A illustrates a flowchart depicting operational steps for identifying one or more optimized service suppliers based on two paths, according to an embodiment. Other embodiments may comprise additional or alternative steps, or may omit some steps altogether.

At step 202, the analytic server may receive a request from an electronic client device, to select one or more optimized service suppliers. In operation, the client may visit a website in an Internet browser or a local application on a mobile device configured to receive requests (e.g., a graphical user interface provided by the analytic server). The client/user may first enter credential information such as username, password, certificate, and biometrics. The electronic client device may transmit the user inputs to the analytic server for authentication. The analytic server may access a system database configured to store user credentials, which the analytic server may be configured to reference in order to determine whether a set of credentials (purportedly authenticating the user) match an appropriate set of credentials that identify and authenticate the user.

After the analytic server authenticates the client, the analytic server may generate and serve web pages to the electronic client device of the client.

Figure 3A:
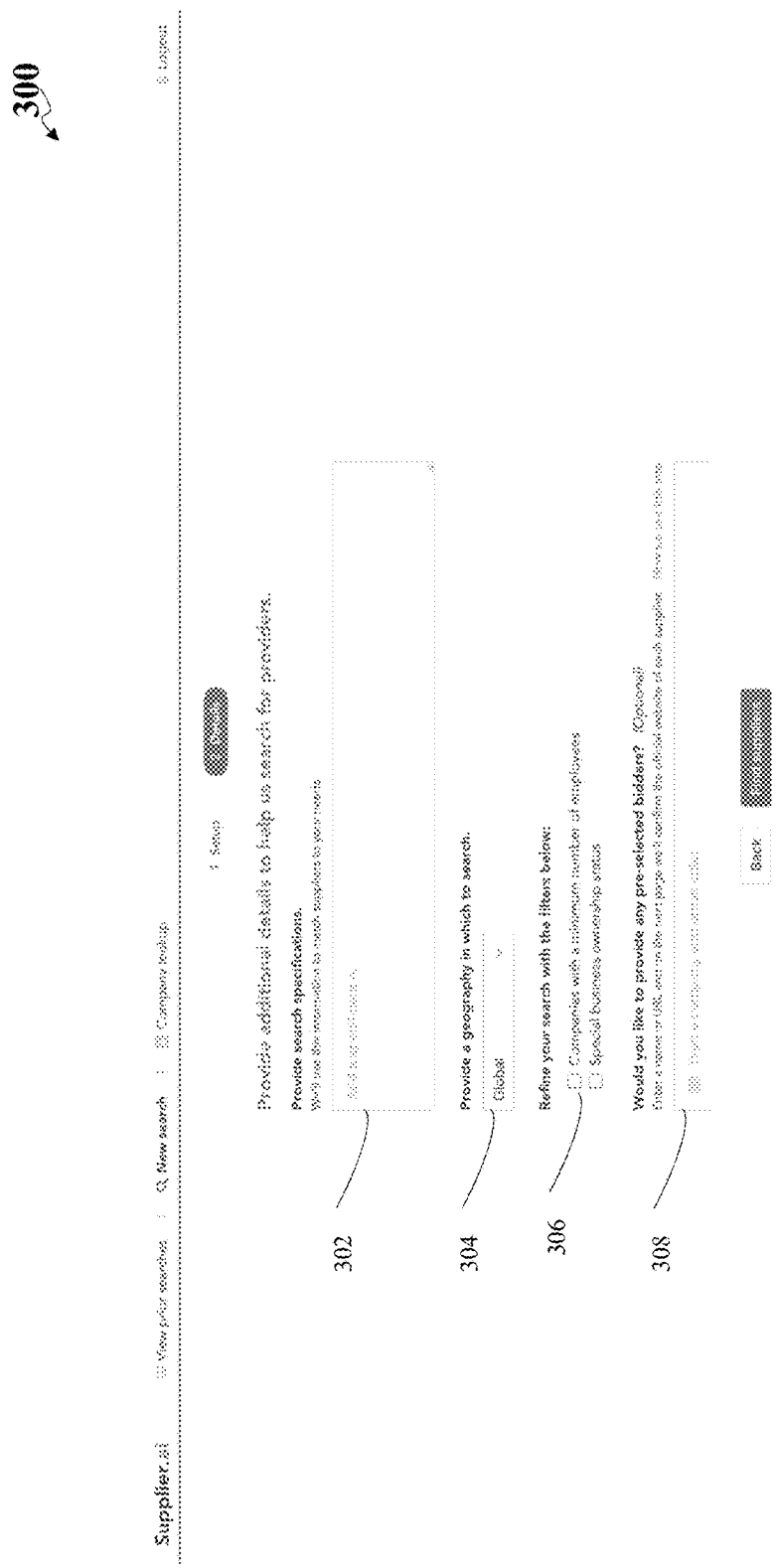
FIG. 3A illustrates an example of a graphical user interface for the client to input requests, according to an embodiment.
Figure 3B:
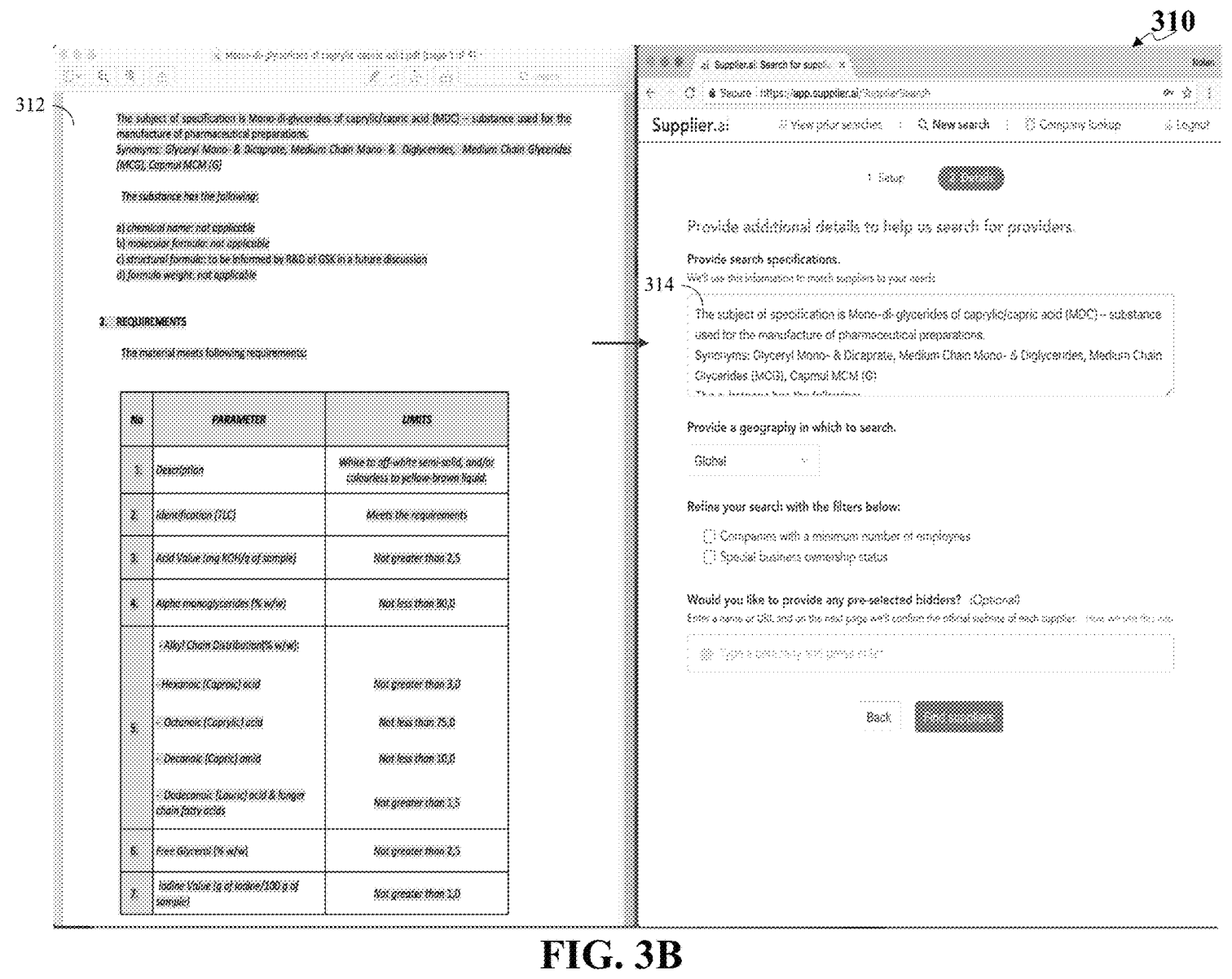
Figure 3C:
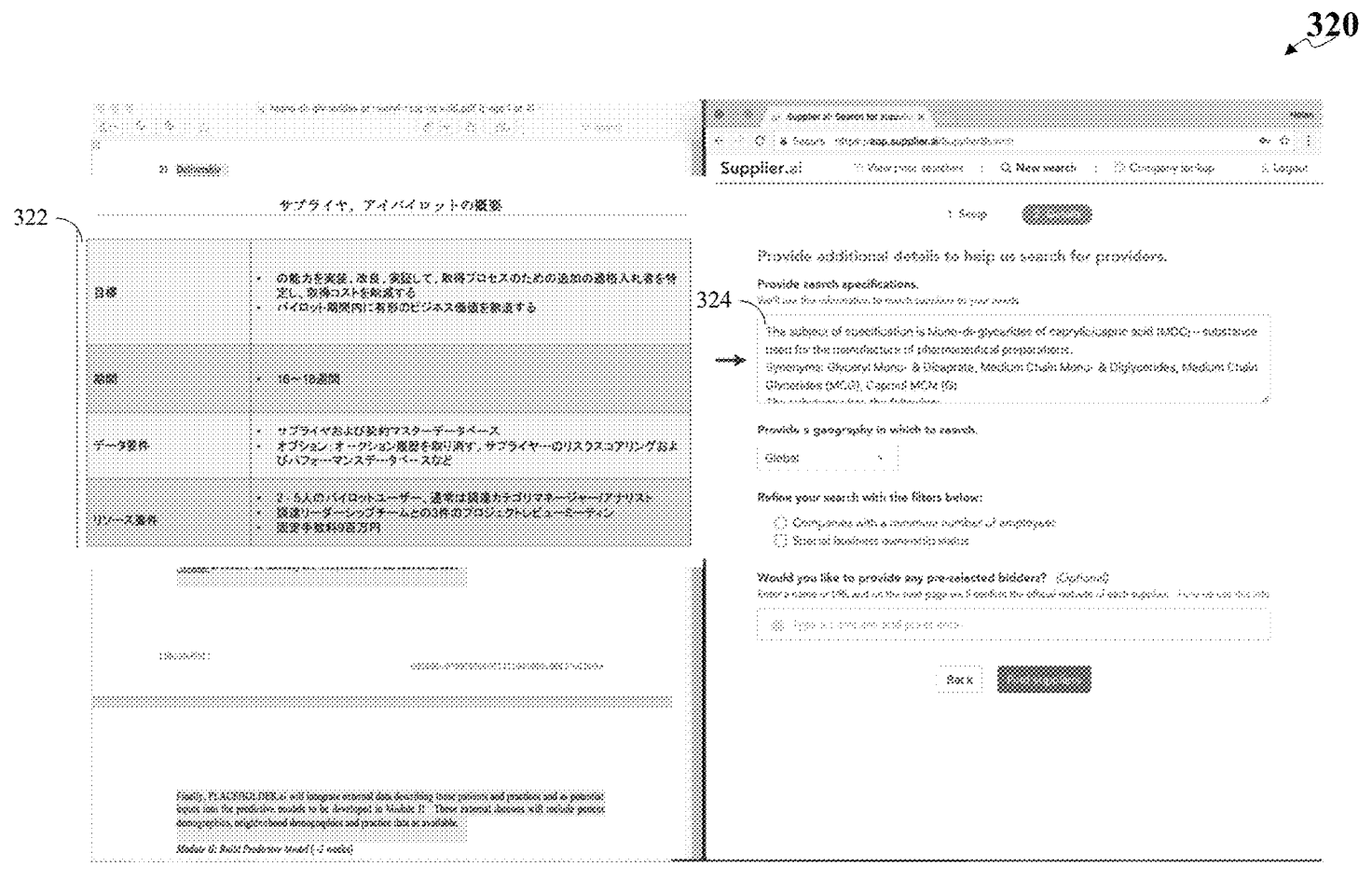
Figure 4A:
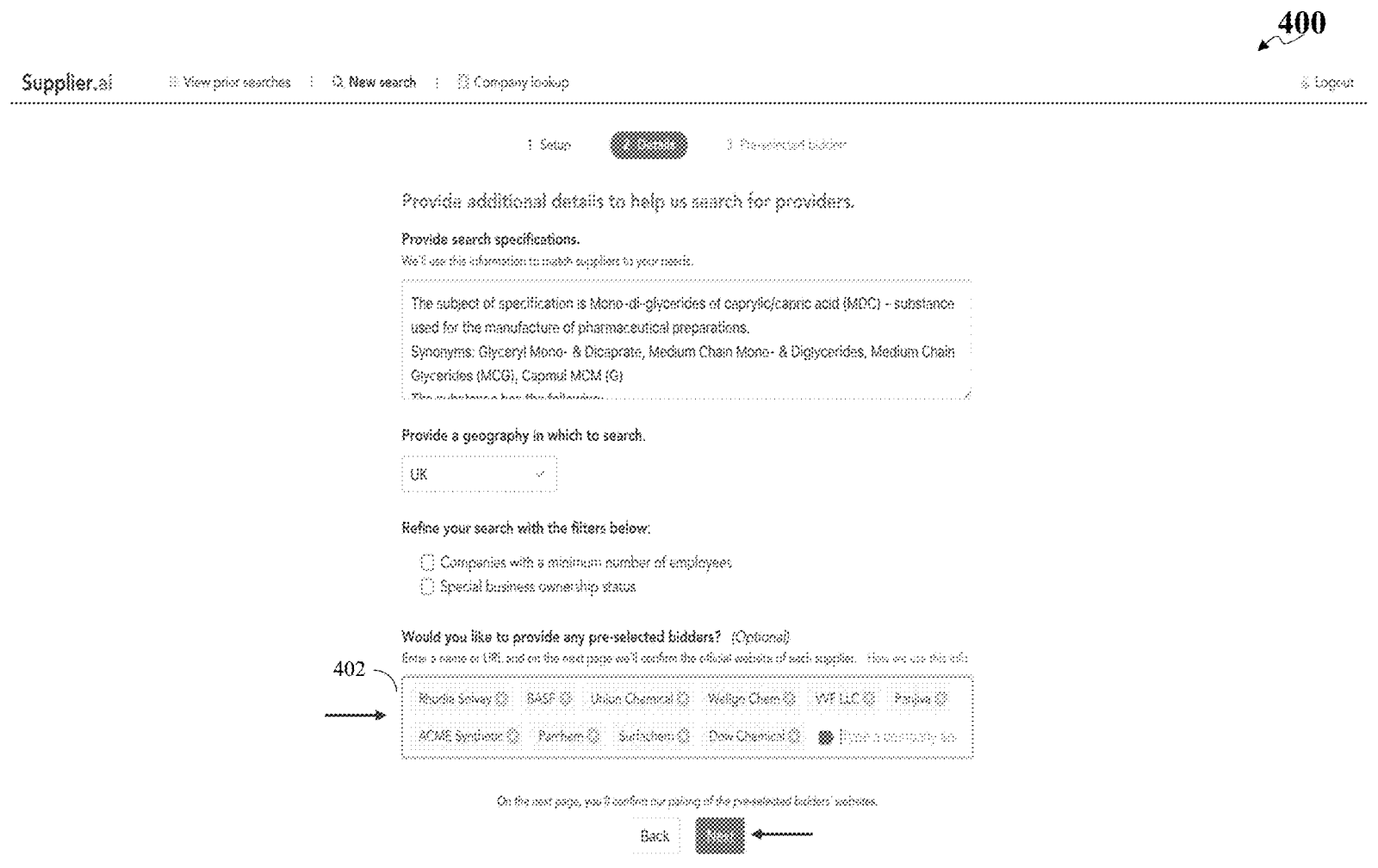

The web pages may include the optimized supplier selection program GUI for the client to input requests comprising search attributes. For example, the user interface may include a text-based interface where the client can manually type requests or simply copy and paste request information from local documents (e.g., contracts, practice guidance and policies, and the like). The client may input search specification in the text-based interface. The search specification may include information on requirements and needs for potential service suppliers. The search specification may be in any language. The analytic server may reformat the search specification and automatically translate the search specification in any language to the required language. The user interface may also include a selection-based interface such as drop down menus or selection buttons and other graphical components where the client can select different options provided by the analytic server. For example, the GUI may include a dropdown menu for the user to provide a geography area in which to search suppliers. The GUI may also include an optional text-based interface for the client to input preselected bidders. The client may input an identifier, such as a name, a URL, or other identification information, of each preselected bidder. FIGS. 3A-3C illustrate an example of the graphical user interface for the client to input requests. FIG. 4A illustrates an example of the graphical user interface for the client to input preselected bidders.

At step 204, the analytic server may determine if the request includes preselected bidders. If the request includes preselected bidders, the process goes to step 206; otherwise, the process goes to step 212.

At step 206, the analytic server may identify web documents of the preselected bidders. As discussed above, the client may input an identifier, such as a name, a URL, or other identification information, of each preselected bidder. The analytic server may identify the official websites and/or web documents of the preselected suppliers/bidders. Based on the identifiers of the preselected bidders, the analytic server may search and locate the official websites of the inputted preselected bidders and generate a list of the official websites on a GUI for the client to confirm that the analytic server finds the correct websites for the preselected bidders. FIG. 4B illustrates an example of the graphical user interface for confirming preselected bidders. After the client confirming the preselected bidders, the analytic server may obtain the correct websites for the preselected bidders.

At step 203, the analytic server may identify additional bidders based on request and the preselected bidders. The analytic server may extract a set of keywords or search attributes from the web pages of the URLs of each of the preselected bidders by web crawling the web pages and search the set of keywords to find web pages/documents for a set of additional potential suppliers that are similar to the preselected bidders. Because the preselected suppliers/bidders include valuable information on the user's preferences and requirements on service suppliers, the analytic server may take advantage of such valuable information to find similar additional service suppliers (additional bidders). In operation, the analytic server may access the web pages of each of the preselected bidders pages based on the corresponding URLs and web crawl the web pages. The analytic server may extract the text from the web pages and analyze the text by natural language processing to extract a set of keywords/terms or search attributes by parsing the text.

In some embodiments, the analytic server may consider the recommendation of the search engines. For example, when the analytic server searches one preselected bidder, the search engine may recommend new keywords/terms based on the information of the preselected bidder. The new keywords/terms may provide more options to describe the preselected bidder. The analytic server may associate such new keywords with the preselected bidder and include such new keywords into the set of the keywords.

The analytic server may search the extracted set of keywords/terms with fuzzy matching in searching engines, such as Google, Bing, DuckDuckGo, and the like. The returned results from the searching engines may be links or URLs for web pages of additional suppliers/bidders including the keywords.

Figure 2B:
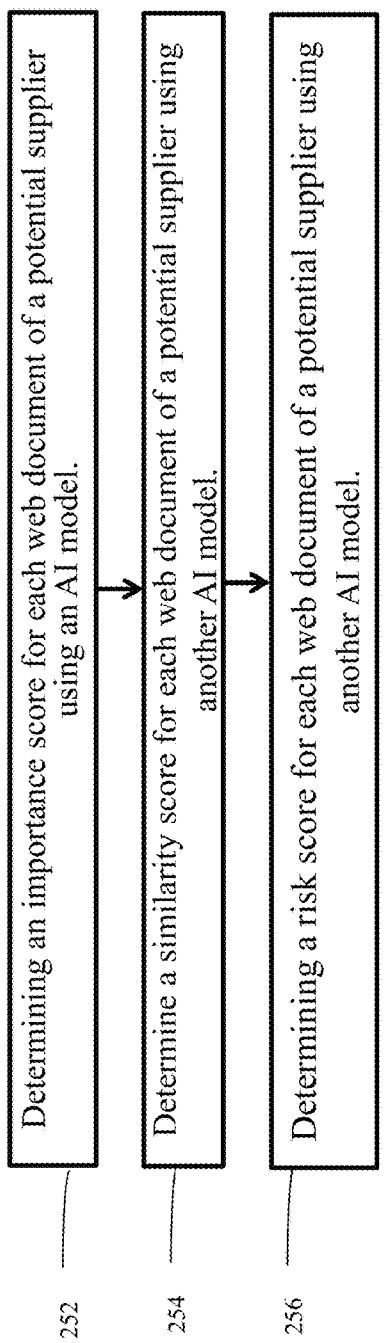
FIG. 2B illustrates a flowchart depicting operational steps for determining one or more optimized service suppliers based on multiple artificial intelligence models, according to an embodiment.

The analytic server may further determine a subset of potential suppliers from the preselected bidders and additional similar bidders using the process described in FIG. 2B.

At step 210, the analytic server may display relevant web documents from the preselected bidders and the additional bidders on a graphical user interface (GUI), The analytic server may display the potential suppliers ranked according to a similarity score in a graphical user interface that includes the risk score. The analytic server may display the preselected bidders/suppliers first followed by other potential suppliers with higher similarity scores and then potential suppliers with relatively lower similarity scores. The analytic server may display a maximum number a threshold value) of potential suppliers.

At step 212, the analytic server may identify web documents of potential suppliers based on the search specification. The analytic server may extract a set of keywords or search attributes from the search specification and search the extracted set of keywords to find web pages/documents for a set of potential suppliers. The search specification may include a large number of keywords. The analytic server may analyze the search specification by natural language processing. The analytic server may identify a set of keywords by parsing the words in the search specification, Specifically, the analytic server may recognize words associated with people, places, events, entities and the like.

The analytic server may search the extracted set of keywords/terms or search attributes with fuzzy matching in searching engines, such as Google, Bing, DuckDuckGo, and the like. The returned results from the searching engines may be links or URLs for web pages including the keywords. The analytic server may retrieve or identify the web documents of potential suppliers by at least one of searching a web, querying a database, and utilizing a web search application programming interface.

The analytic server may further determine a subset of potential suppliers from the returned search results using the process described in FIG. 2B.

At step 214, the analytic server may display the relevant web documents of the potential suppliers in the GUI. The analytic server may display the potential suppliers ranked according to a similarity score in a graphical user interface that includes the risk score. The analytic server may display the preselected bidders/suppliers first followed by other potential suppliers with higher similarity scores and then potential suppliers with relatively lower similarity scores. The analytic server may display a maximum number (e.g., a threshold value) of potential suppliers.

Figure 5:
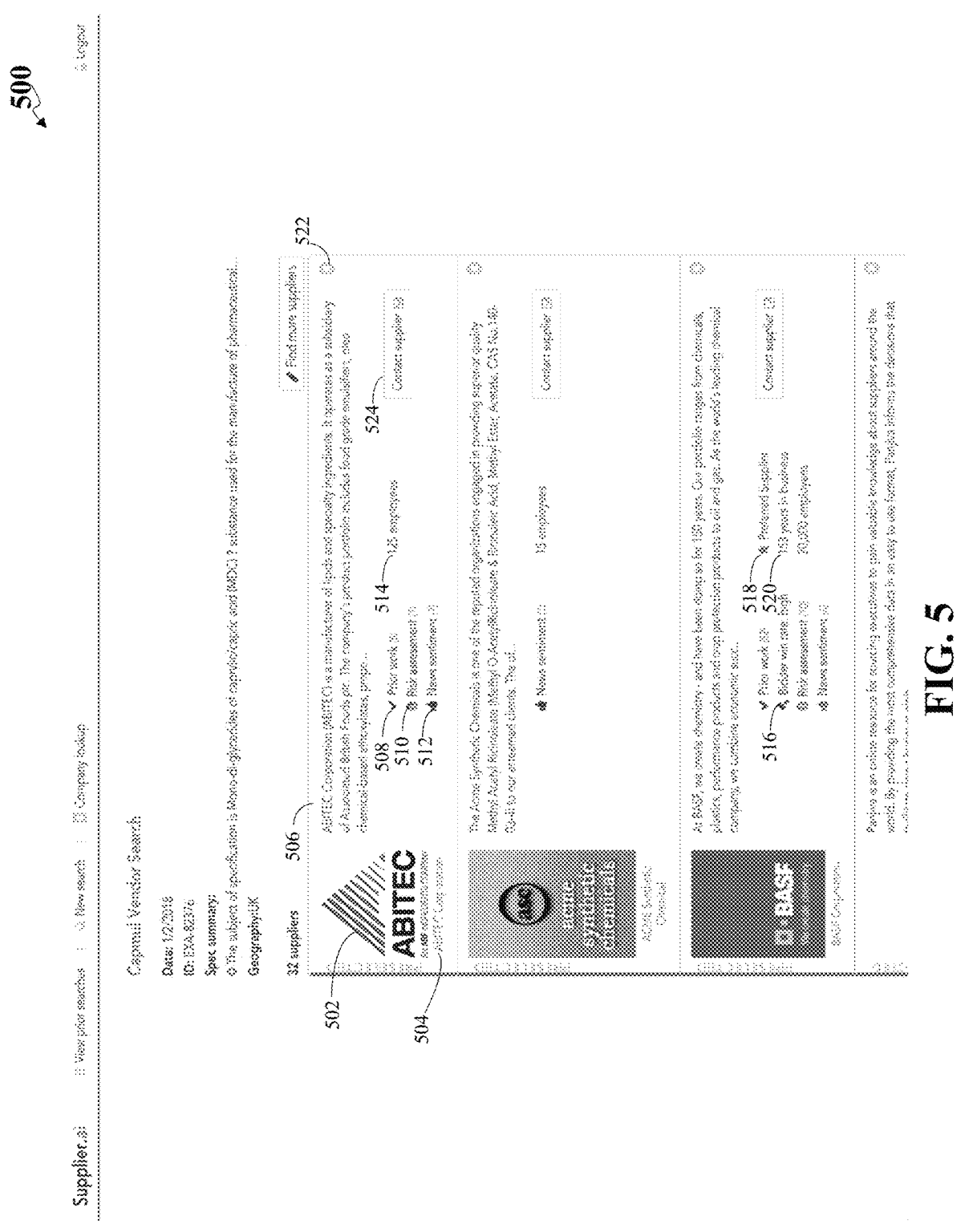

For each displayed potential supplier, the analytic server may also include a summary for the company, graphical elements for prior work, number of employees, risk assessment, news sentiment, and other related information to provide more information of the potential supplier. FIG. 5 illustrates an example of a graphical user interface for displaying potential suppliers. Upon the client selecting one of the potential suppliers, the analytic server may generate an electronic message (e.g., email message) directed to the address of the selected potential supplier. The electronic message may contain a predetermined text string.

FIG. 2B illustrates a flowchart depicting operational steps for determining one or more optimized service suppliers based on multiple artificial intelligence models, according to an embodiment. Other embodiments may comprise additional or alternative steps, or may omit some steps altogether.

At step 252, the analytic server may determine an importance score for web documents of each potential supplies. As discussed above, the analytic server may identify the web documents of potential suppliers including potential suppliers found based on search specification, the preselected bidders, and additional bidders similar to the preselected bidders. However, such web documents may not be associated with real suppliers. There may be web pages including the keywords/terms, but not for a real supplier. For example, some web pages may be public standards for the legal rules for doing business of goods or services. Some web pages may be from trade journals. Such web pages may include the keywords/terms and look a lot like a supplier.

The analytic server may perform importance modeling that distinguishes supplier companies from non-supplier companies and determines an importance score that is the probability of the web pages being from a supplier. The analytic server may determine the probability of web pages being from a supplier by using the neural network, which is the general neural network of importance.

Furthermore, the analytic server may check the domain name of web address and do hard kills in a deterministic way. For example, the analytic server may determine that URLs ending in .edu, .gov, .uk are not for supplier companies.

In addition, the analytic server may train a second neural network to determine if the web pages are from trade journals. The second neural network may be specialized hunter-killers whose job is to kill the false information the hard kills do not recognize based on the domain name. The reason to employ a second neural network is to allow the hard kills to be more permissive. If the hard kills are too strict, they may kill the missed case, such as trade journals, but they may also kill real suppliers. The more permissive hard kills may keep all the real suppliers, even if some noise (e.g., trade journals) may be included too. To filter out the trade journals, the analytic server may apply the second neural network.

After performing the importance modeling, the analytic server may generate a list of URLs of a subset of potential suppliers that matches the keywords/terms of user search specification or similar to preselected bidders and are determined to be real suppliers. For example, the analytic server may generate a first subset of web documents (e.g., a list of URLs) by determining that the importance score (the probability of web pages being from real suppliers) satisfies a threshold.

At step 254, the analytic server may execute an artificial intelligence model and determine a similarity score for web documents of each potential supplier by performing a relevance modeling. As discussed above, the analytic server may identify the web documents of potential suppliers including potential suppliers found based on search specification, the preselected bidders, and additional bidders similar to the preselected bidders. Specifically, for the set of potential suppliers identified based on the search specification, the similarity score for each of the potential suppliers may be between the specification and the web pages for each potential supplier. For the set of potential suppliers (additional bidders) identified based on the preselected bidder, the similarity score for each of potential suppliers may be between the preselected bidders and the additional bidders.

To determine the similarity score for each of the set of potential suppliers based on the search specification, the analytic server may vectorize the set of keywords extracted from the search specification. Furthermore, the analytic server may web crawl the web pages of each of the set of potential suppliers, extract keywords from the web pages, and vectorize the web page keywords. The analytic server may calculate the similarity score based on the vectorized keywords from search specification and the web pages. The analytic server may select a second subset of web documents with similarity scores satisfying a threshold.

To determine the similarity score for each of the potential suppliers (additional bidders) identified based on the preselected bidder, the analytic server may vectorize the set of keywords extracted from a preselected bidder website. Furthermore, the analytic server may extract the keywords of the corresponding potential suppliers similar to the preselected bidder, and vectorize each similar supplier's keywords. The analytic server may calculate the similarity score based on the vectorized keywords from the preselected bidder/supplier and each similar supplier's keywords. The analytic server may determine a number of potential suppliers that are most similar to each preselected bidder based on the similarity scores. For example, the analytic server may determine top 10 similar suppliers for preselected bidder A, top 10 similar suppliers for preselected bidder B, etc. Alternatively, the analytic server may determine top matches based on the similarity scores satisfying a threshold. By finding the top matches for each of the preselected bidder, the analytic server may find suppliers in the second set of potential suppliers that are most similar to the preselected bidders.

To vectorize each web document of potential suppliers and preselected bidders, the analytic server may clean the text of the web document and extract a set of terms from the web document. The analytic server may deobfuscate the set of terms to identify a plurality of terms within the set of terms, vectorize the terms in the text, and build the neural network. The analytic server may generate a set of vectors for the plurality of terms, with each vector value representing an n-gram value corresponding to each term within the plurality of terms. To vectorize the keywords/terms, the analytic server may employ vector space model or term vector model that is an algebraic model for representing text documents (and any objects, in general) as vectors of identifiers, such as, for example, index terms. It is used in information filtering, information retrieval, indexing and relevancy rankings. Documents are represented as vectors. Relevance rankings of documents in a keyword search can be calculated, using the assumptions of document similarities theory, by comparing the deviation of angles between two document vectors.

In some embodiments, the analytic server may execute a blacklisting protocol comprising pre-determined blacklisting criteria and a whitelisting protocol comprising pre-determined whitelisting criteria. Specifically, the analytic server may build a whitelist and a blacklist. The whitelist may comprise the terms that need to be included in the text of web documents, and any other standards such as a certain name must be capitalized, and the like. The blacklist may include the terms that should not appear in the text of web documents. The analytic server may check if the web documents satisfy the whitelist and blacklist and exclude the web documents not satisfying the whitelist and blacklist. The analytic server may generate the whitelist and blacklist based on user's input via a GUI. The analytic server may identify a third subset of the web documents based on a combined value from the importance score, the relevance score, and the pre-determined blacklisting criteria. The analytic server may further identify a fourth subset of web documents based on executing the whitelisting protocol on the third subset of web documents.

At step 256, the analytic server may determine a risk score for each potential supplier. As discussed above, the analytic server may generate a list of URLs of the potential suppliers that either match the search specification or similar to the preselected bidders. Based on the URLs, the analytic server may access the companies' home pages and identify the company names and logos. With the company name of each potential supplier, the analytic server may find news/articles on the company. In addition, when one or more potential suppliers have current or historical contracts with the client, the analytic server may query the internal supplier database to retrieve data about existing suppliers. If there is risk analysis available in the internal database for the existing suppliers, the analytic server may access such relevant internal data of the companies. The analytic server may trace the tree of reports and find the most recent report that has relatively complete financials. The analytic server may also access registered companies house files information to access financial related data and aggregate information from different sources, such as internal and external sources, to generate a financial report for each potential supplier. Furthermore, the analytic server may aggregate articles/news and other recent reports to generate a news summary for each potential supplier.

The analytic server may train an artificial intelligence model (e.g., a neural network) to determine the negativity of the news/articles based on a threshold. The value of the threshold may determine how to define the extent of negativity. For example, the analytic server may find thousands of articles regarding a particular supplier. The analytic server may set a higher threshold to only look at really bad news. As a result, the analytic server may determine that 10% of the articles are bad news, and 90% of the articles are not bad news. Alternatively, if the analytic server sets a relatively low threshold, the analytic server may determine that 40% of the articles are bad news, and 60% of the articles are not bad news. Based on the negative news, the analytic server may determine a risk score. The risk score may reflect not only how had the bad news is, but also the percentage of the bad news. The risk score may change by adjusting the threshold value.

FIG. 3A illustrates an example of a graphical user interface 300 for the client to input requests, according to an embodiment. The graphical user interface (GUI) may include a text-based interface 302 for the client to input the search specification. The client can manually type search specification or copy and paste the specification from local documents. The search specification may be in any format and in any language. The analytic server may reformat the search specification and automatically translate the search specification to the required language. The GUI may also include a selection-based interface such as a drop down menu 304 for the client to provide a geography in which to search the suppliers. The GUI may include selection buttons 306 where the client can select different options to refine the search with filers. The GUI may include a text-based interface 308 for the client to input preselected bidders. The client may input an identifier, such as a name, a URL, or other identification information, of each preselected bidder.

FIG. 3B illustrates an example of a graphical user interface 310 for the client to copy and paste a local document into the search specification interface, according to an embodiment. The document 312 (e.g., contracts, practice guidance and policies, and the like) may include text, tables, and any other forms. The analytic server may automatically extract information from the document, reformat the information from the copied document, and display the information in the text-based interface 314. The analytic server may search potential suppliers based on the information in the text-based interface 314.

FIG. 3C illustrates an example of a graphical user interface 320 for the client to copy and paste a local document in a different language into the search specification interface, according to an embodiment. The analytic server may support the search specification in different languages. For example, the client may copy and paste a local document in Japanese 322 into the search specification interface. The analytic server may automatically translate the search specification into a required language, such as English, and display the specification in the text-based interface 324 in English.

FIG. 4A illustrates an example of a graphical user interface 400 for the client to input preselected bidders, according to an embodiment. The GUI may also include a text-based interface 402 for the client to input preselected bidders. The client may input an identifier, such as a name, a URL, or other identification information, of each preselected bidder.

FIG. 4B illustrates an example of a graphical user interface 410 for the client to confirm preselected bidders, according to an embodiment. Based on the identifiers of the preselected bidders input by the client, the analytic server may search and locate the official websites of the inputted preselected bidders and generate a list of the official websites on a GUI for the client to confirm that the analytic server finds the correct websites for the preselected bidders. The list of the preselected bidders displayed on the GUI may include the company name 412 the domain of the company 414, and the link of the company 416. After identifying the official websites of the preselected bidders, the analytic server may access the companies' home pages and identify/display the company names 412. The domain of the company 414 may be the official web address of the each company's home page. The link of the company 416 may be the hyperlink that directs the client to the home page of the listed company.

FIG. 5 illustrates an example of a graphical user interface 500 for displaying potential suppliers, according to an embodiment. In the GUI, the analytic server may display the preselected bidders first then other potential suppliers ranked according to the similarity scores. For each displayed potential supplier, the analytic server may also include a company logo 502, a company name 504, summary for the company 506, a button for contacting the supplier 524, graphical elements for prior work 508, risk assessment 510, news sentiment 512, number of employee 514, and other related information to provide more information of potential suppliers. For example, the GUI may include bidder win rate 516, how many years in business 520 of the company. If the supplier is a preferred supplier, the GUI may include a graphical element indicating the supplier is preferred supplier 518. The GUI may also include a closing button 522 for removing a potential supplier. In operation, the client may check the information related to each potential supplier, such as the prior work, risk assessment, news sentiment, and the like to determine if the potential supplier is a good candidate or not. If not, the client may be able to remove the potential supplier by clicking on the closing button 522. The analytic server may create a blacklist of companies for the client by recording the companies the client removed. The analytic server may keep track of companies the client does not want, and use such information as a context of the client to determine potential suppliers that may satisfy the client's request.

Figure 6:
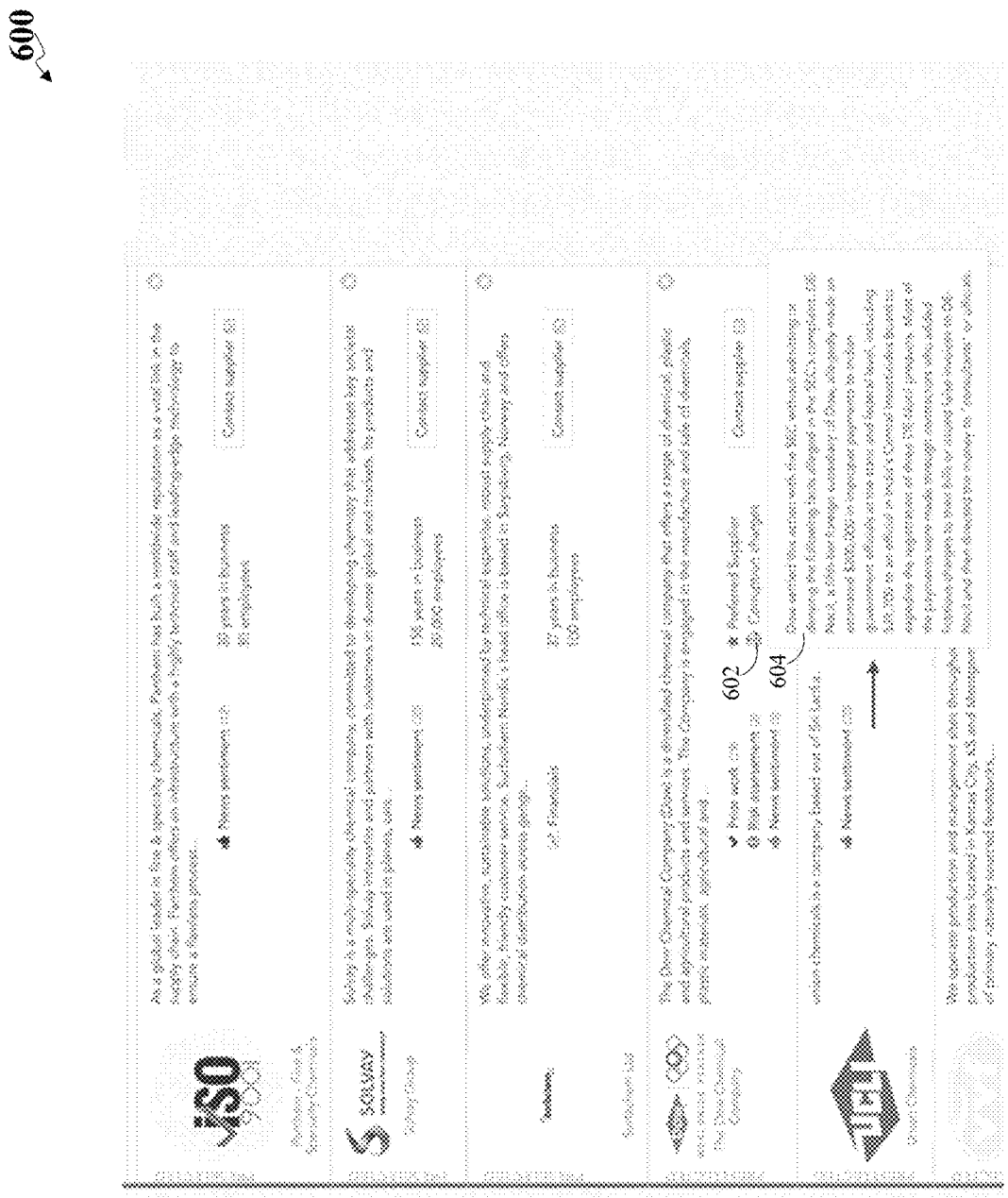
FIG. 6 illustrates an example of a graphical user interface for displaying a potential supplier with corruption charges, according to an embodiment.

FIG. 6 illustrates an example of a graphical user interface 600 for displaying a potential supplier with corruption charges, according to an embodiment. The analytic server may web crawl news/articles about a potential supplier. If the analytic server finds news/articles of corruption charges against a potential supplier, the analytic server may display a graphical element of corruption charges 602 for the specific potential supplier in the GUI. Upon the client interacting with the graphical element (e.g., clicking on the element), the analytic server may display a dialog box or a window 604 that displays detailed information regarding the corruption charges.

Figure 7A:
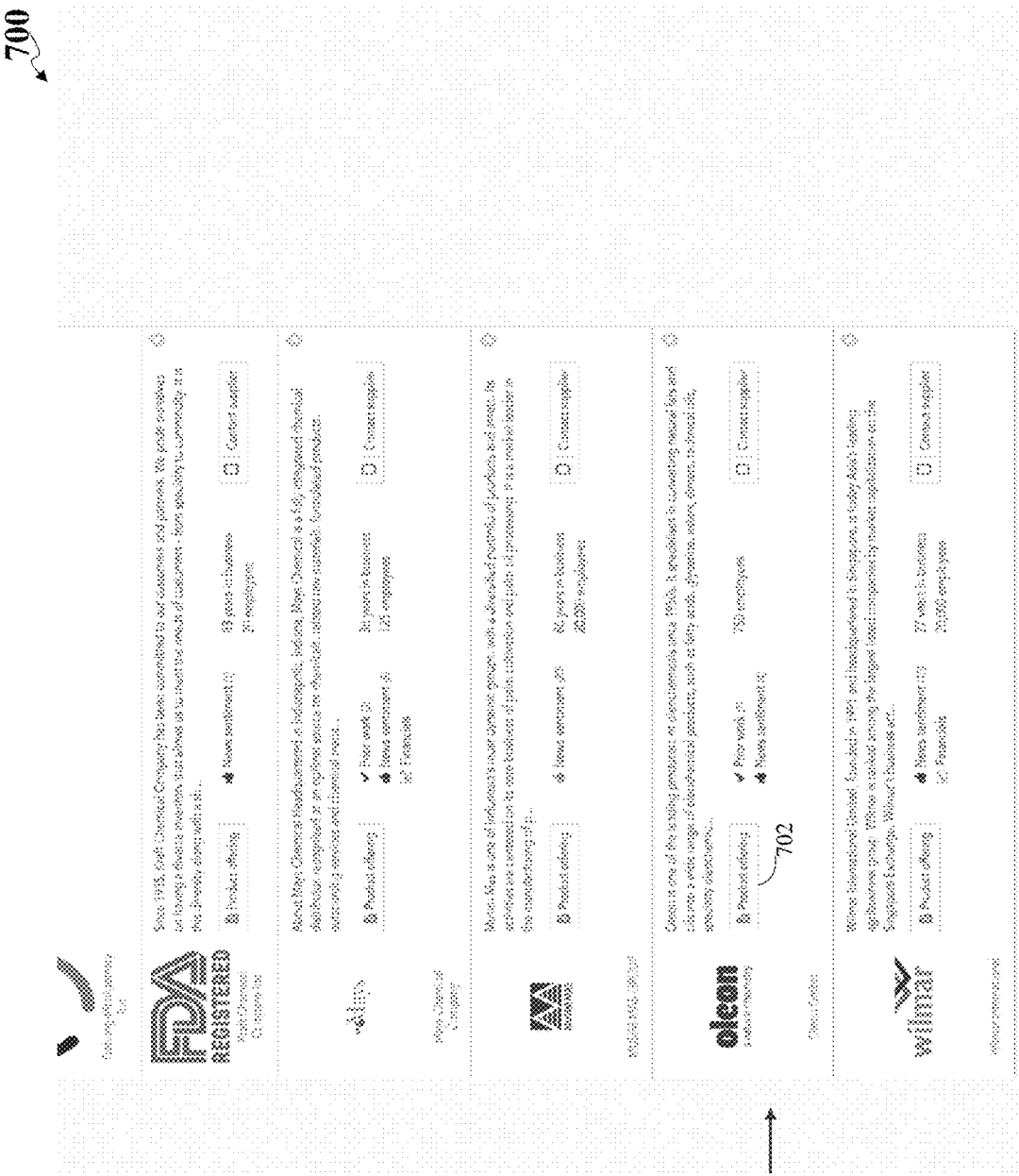
FIG. 7A illustrates an example of a graphical user interface for displaying a potential supplier with product offering, according to an embodiment.

FIG. 7A illustrates an example of a graphical user interface 700 for displaying a potential supplier with product offering, according to an embodiment. The GUI of the list of potential suppliers may include an interactive graphical element for product offering 702. Upon the client interacting with the graphical element (e.g., clicking on the graphical element), the analytic server may display another GUI for displaying the offered product details.

Figure 7B:
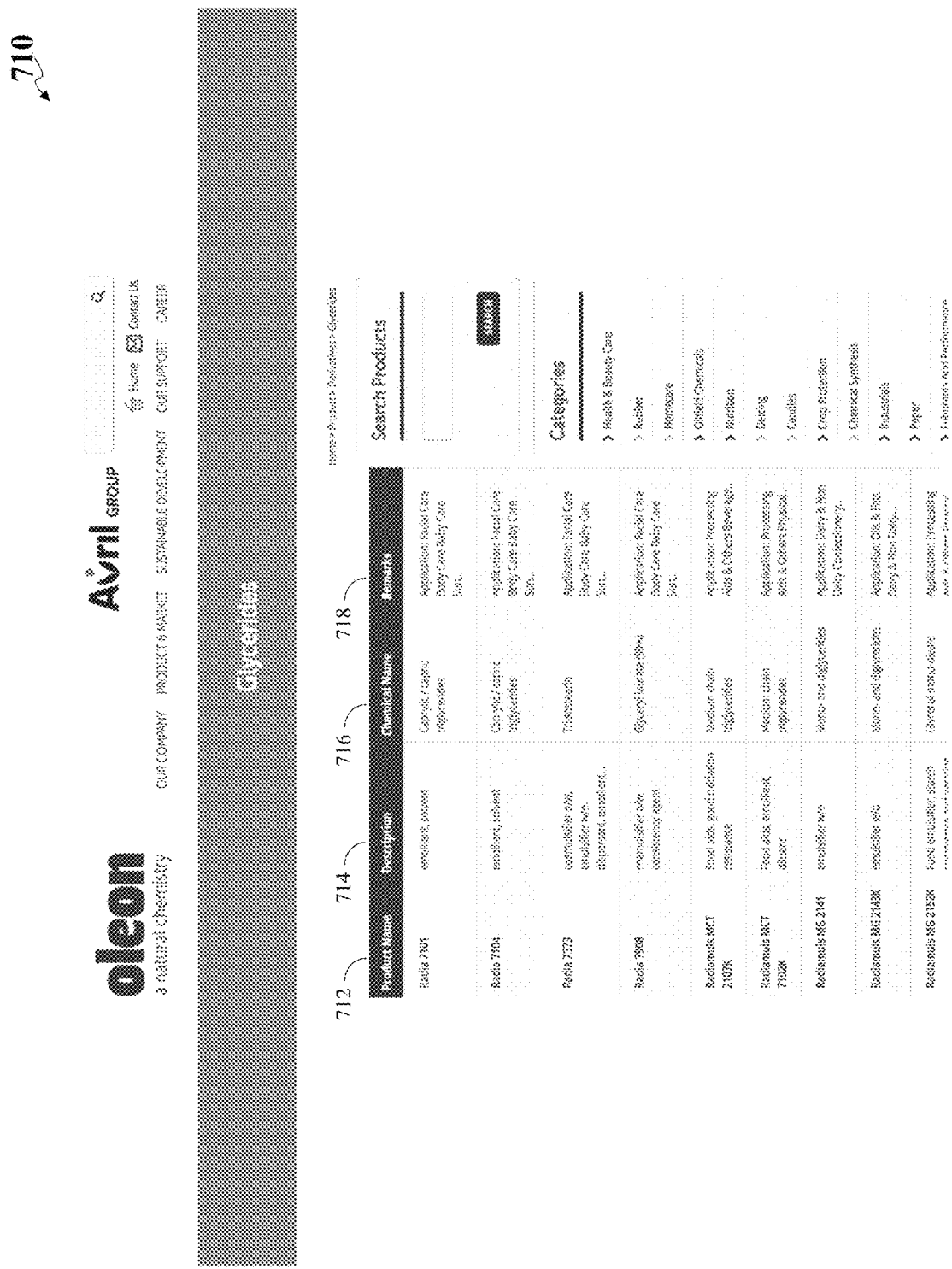
FIG. 7B illustrates an example of a graphical user interface for displaying product offering, according to an embodiment.

FIG. 7B illustrates an example of a graphical user interface 710 for displaying product offering, according to an embodiment. The analytic server may web crawl the web pages of a potential supplier and find product-offering information. For each product offered by the supplier, the GUI may include product name 712, product description 714, chemical name 716, and remarks 718. By providing detailed information of the products, the analytic server may allow the client to determine whether the potential supplier is a right fit for the client's needs.

Figure 8A:
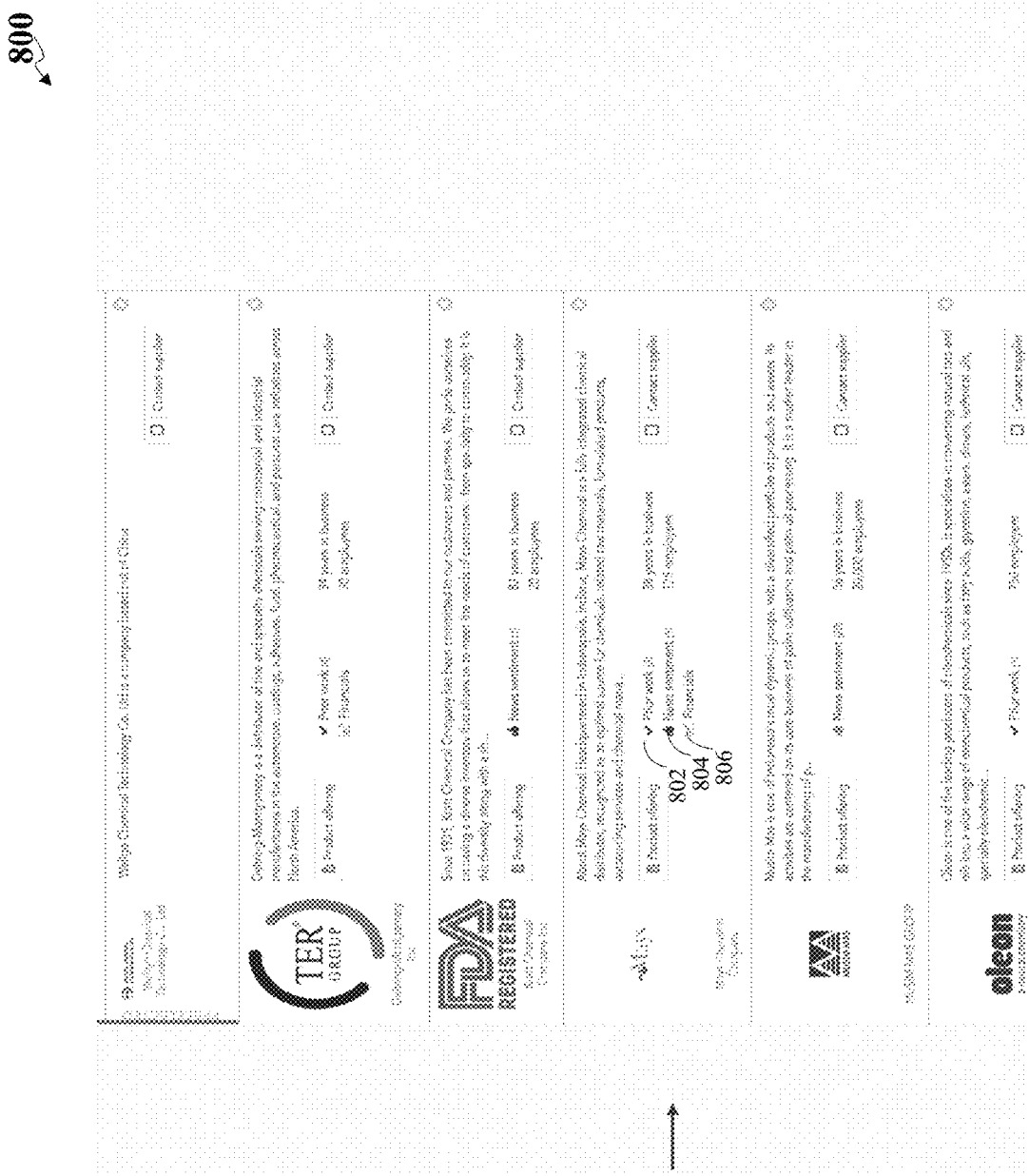
FIG. 8A illustrates an example of a graphical user interface for displaying a potential supplier with prior work, news, and financials, according to an embodiment.
Figure 8B:
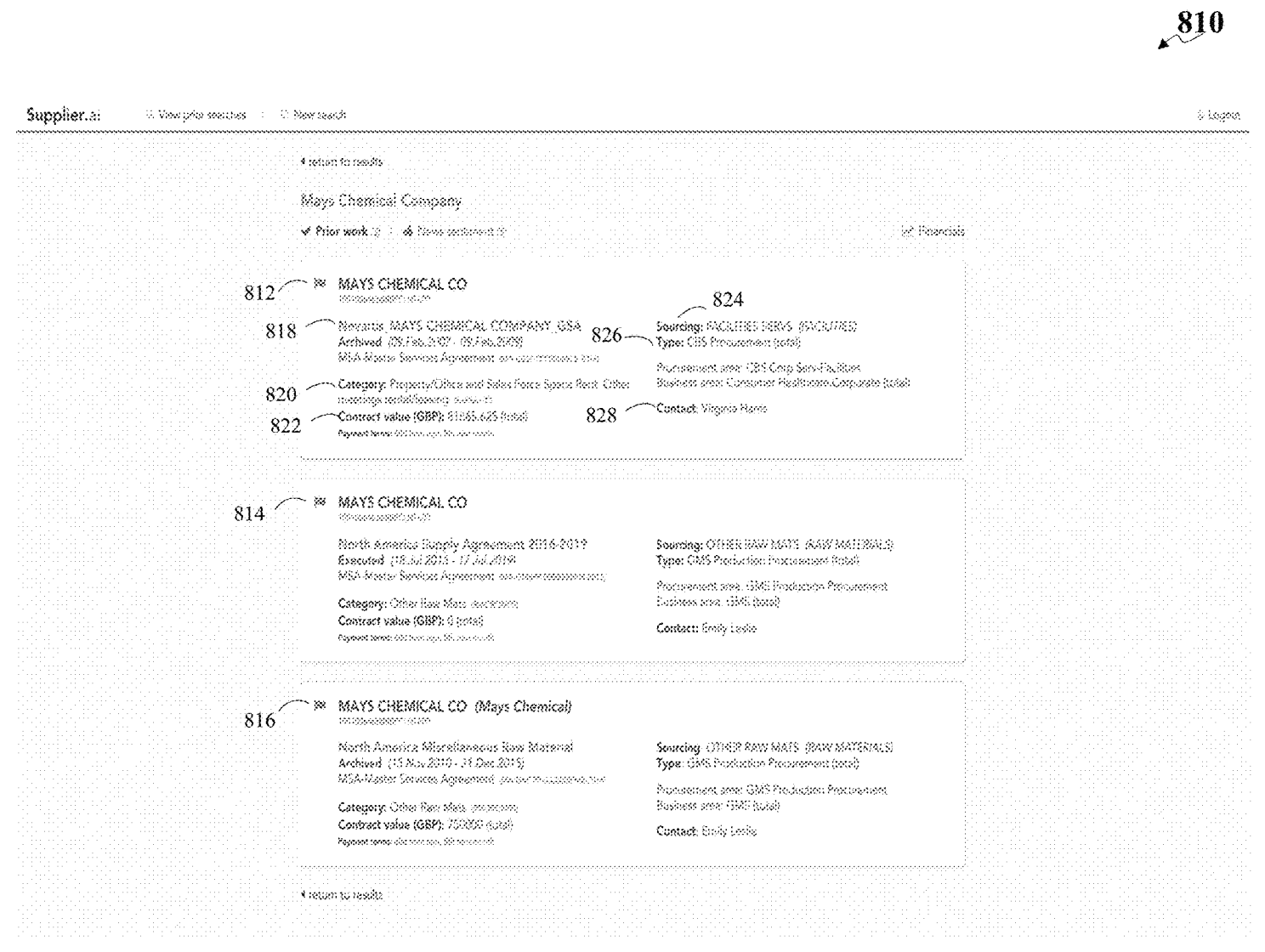

FIG. 8A illustrates an example of a graphical user interface 800 for displaying a potential supplier with prior work, news, and financials, according to an embodiment. The GUI of the list of potential suppliers may include an interactive graphical element for prior work 802. Upon the client interacting with the graphical element (e.g., clicking on the graphical element), the analytic server may display another GUI for displaying the prior work. The GUI may also include an interactive graphical element for news 804. Upon the client interacting with the graphical element, the analytic server may display another GUI for displaying the news of the potential supplier. The GUI may also include an interactive graphical element for financials 806. Upon the client interacting with the graphical element, the analytic server may display another GUI for displaying the financials, FIG. 8B illustrates an example of a graphical user interface 810 for displaying prior work of a potential supplier, according to an embodiment. When one or more potential suppliers have current or historical contracts with the client, the analytic server may query the internal supplier database to retrieve data about existing suppliers and extract information on the services and/or products provided by the suppliers, the contract information, the contacts and other valuable information. For example, the analytic server may display three prior works 812, 814, 816 for a specific supplier "Mays Chemical Company." For each prior work, the GUI may include the prior work name 818, category of product 820, contract value 822, sourcing of the work 824, type of the work 826, and internal contact for the specific work 828. The GUI may also include other related information for the specific projects of prior work.

Figure 8C:
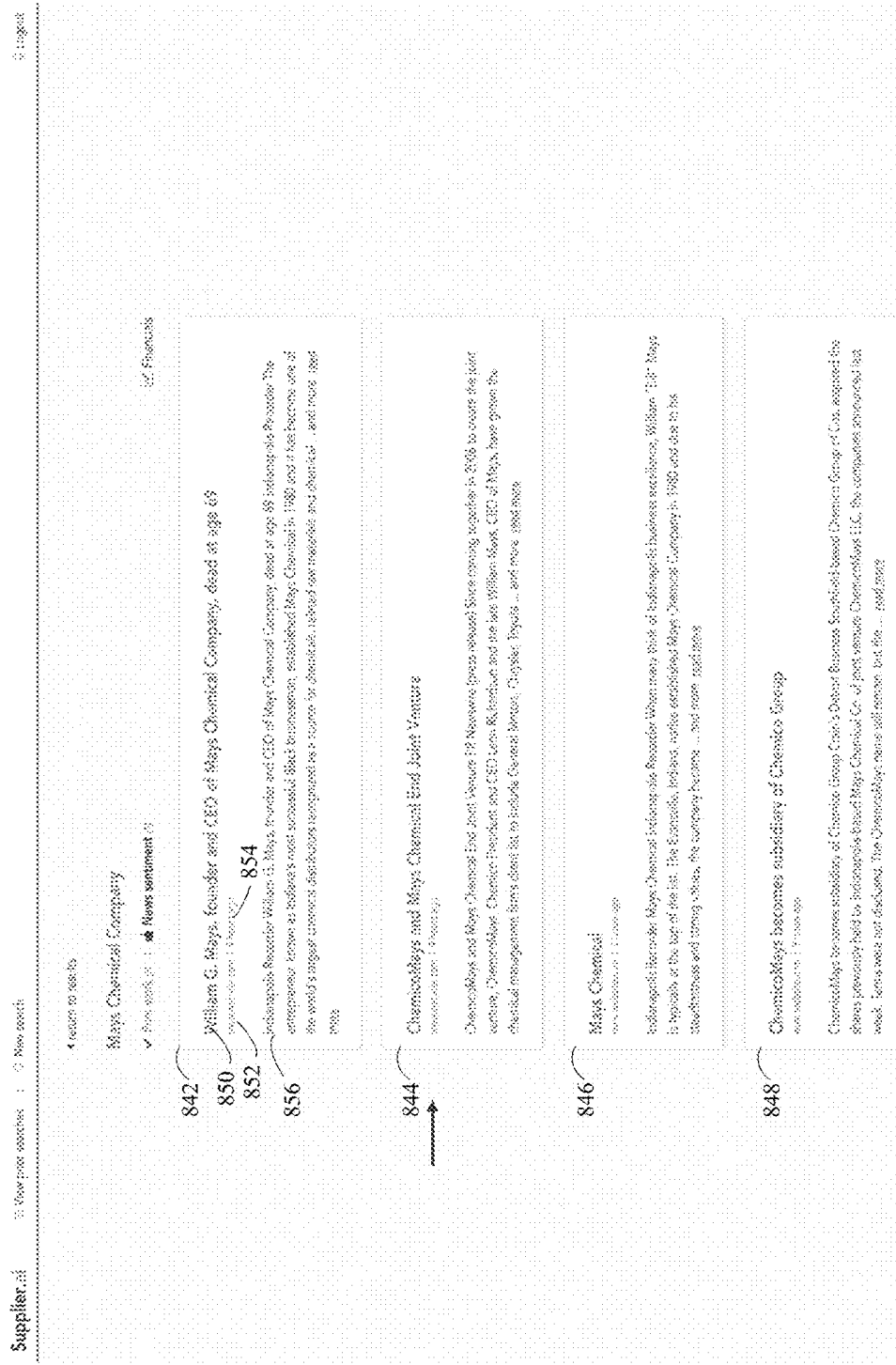
FIG. 8C illustrates an example of a graphical user interface for displaying a list of news of a potential supplier, according to an embodiment.

FIG. 8C illustrates an example of a graphical user interface 840 for displaying a list of news of a potential supplier, according to an embodiment. The analytic server may display a maximum number (e.g., a threshold value) of news in the list. For each potential supplier, the analytic server may find news or articles on the company, and generate/display a list of news 842, 844, 846, 848 in the GUI. The analytic server may display each news with a title 850, a web address 852, recentness (e.g., 9 hours ago) 854, a summary 856 of the news. The client may select one or more news that interest the client by clicking on the news. The analytic server may direct the client to the original web page including the news based on the web address. For example, the client may click on the news 844 "ChemicoMays and Mays Chemical End Joint Venture." The analytic server may display the web page of this particular news on the client's device.

Figure 8D:
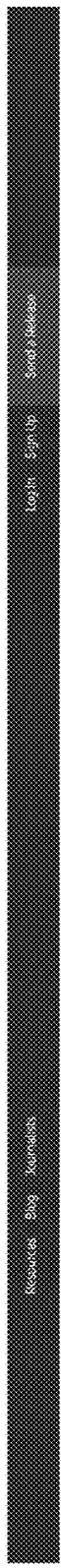
FIG. 8D illustrates an example of a graphical user interface for displaying particular news selected by the client, according to an embodiment.
Figure 8D:
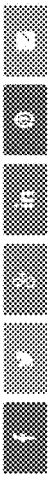
Figure 8D:
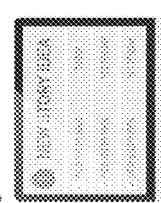
Figure 8D:

FIG. 8D illustrates an example of a graphical user interface 860 for displaying particular news selected by the client, according to an embodiment. The analytic server may direct the client to the original web page including the selected news. The web page may include the title 862 of the news, the content 864 of the news, and any other related information.

Figure 8E:
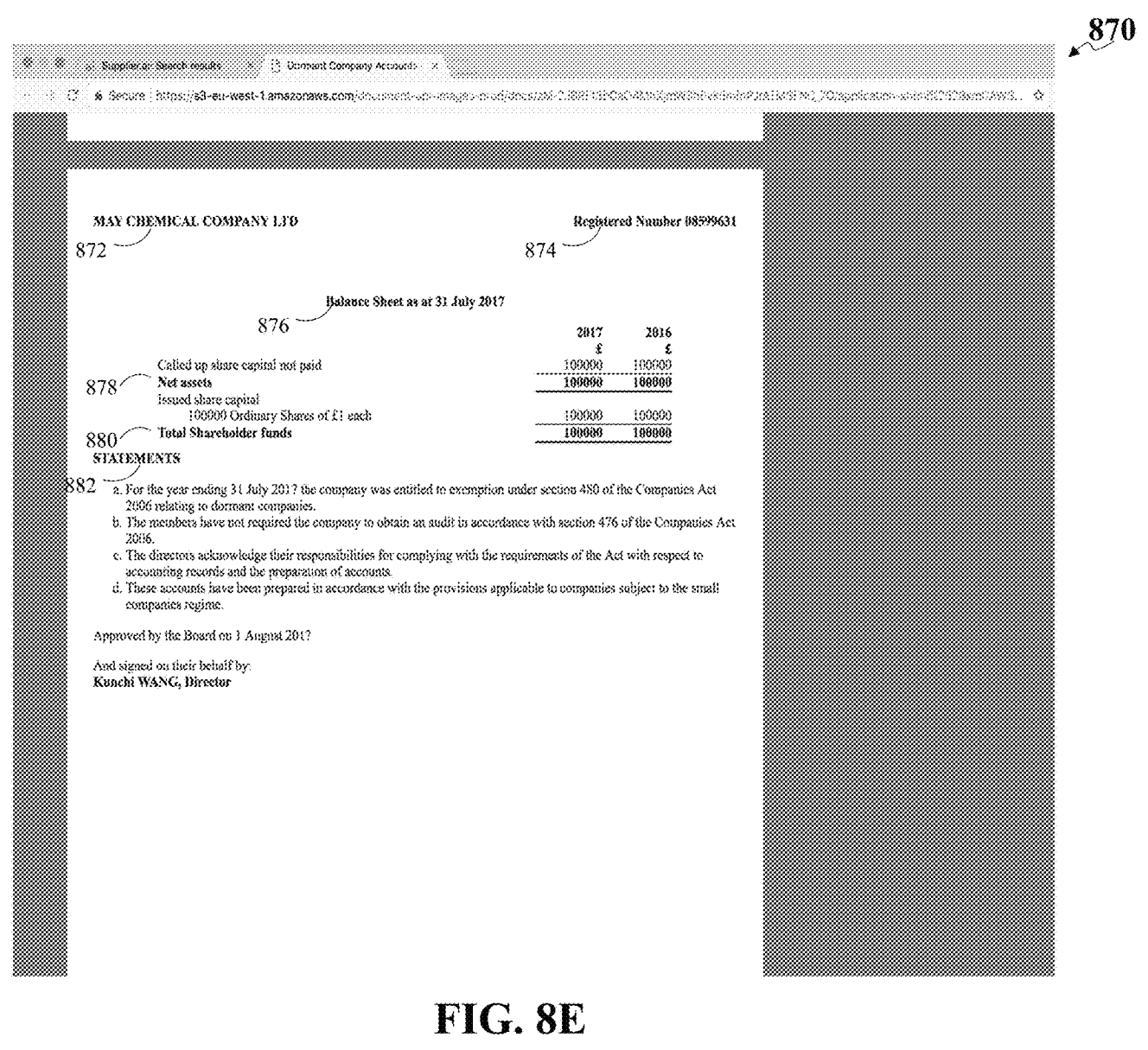

FIG. 8E illustrates an example of a graphical user interface 870 for displaying the financials of a potential supplier, according to an embodiment. The GUI may include a financial report that may be an image, a PDF document, a word document, or in any other format. The financial report may comprise the company name 872, registered number 874, balance sheet 876, net assets 878, total shareholder funds 880, statements 882, and any other related information.

Figure 9A:
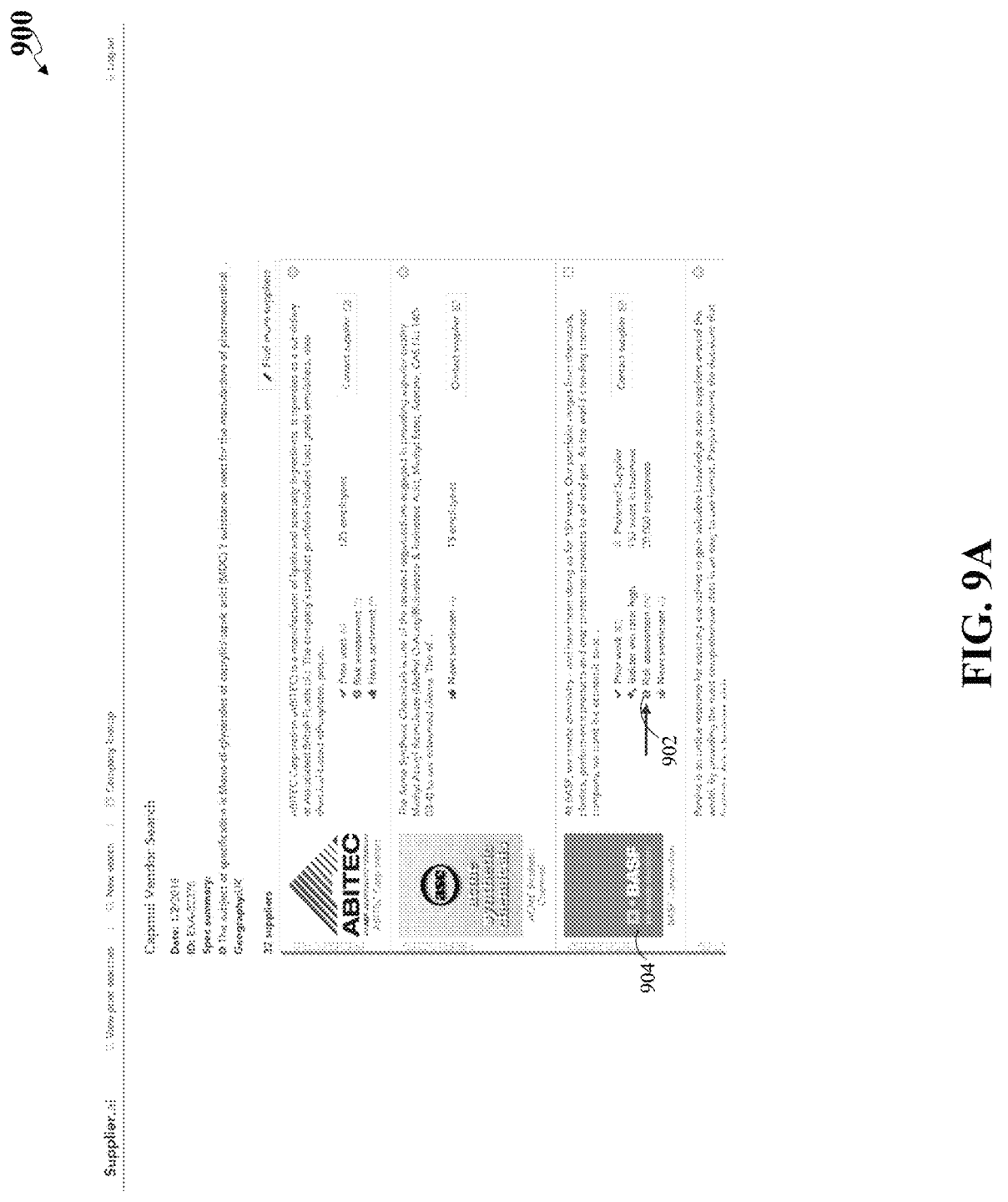

FIG. 9A illustrates an example of a graphical user interface 900 for the client to interact with risk assessment component of a particular potential supplier, according to an embodiment. The client may interact with (e.g., click on) a graphical component of risk assessment 902 of a particular potential supplier, such as BASF 904. Upon the client interacting with the risk assessment component, the analytic server may display another GUI for displaying the selected company's risk assessment.

Figure 9B:
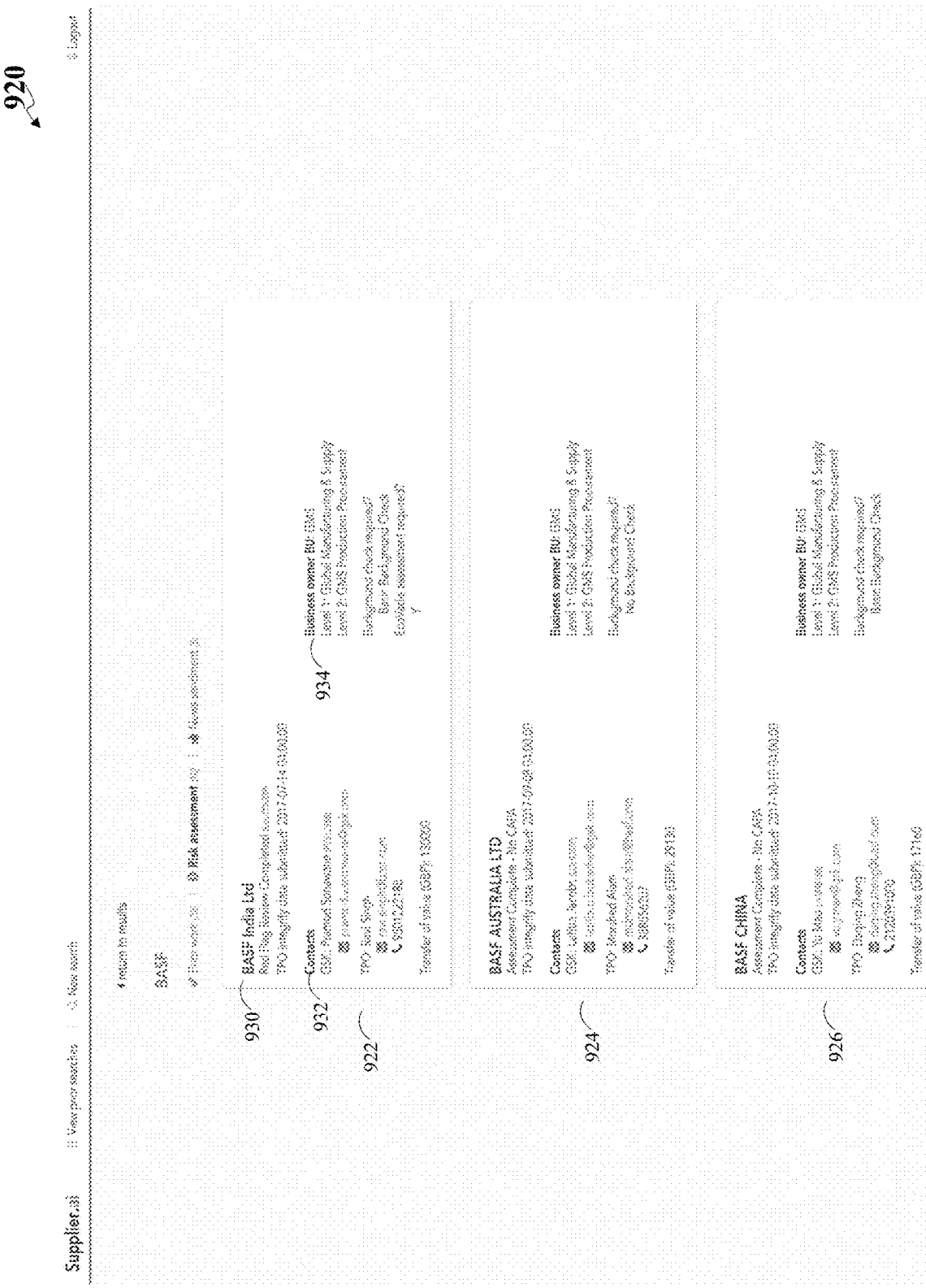
FIG. 9B illustrates an example of a graphical user interface for displaying risk assessment for a particular potential supplier, according to an embodiment.

FIG. 9B illustrates an example of a graphical user interface 920 for displaying risk assessment for a particular potential supplier, according to an embodiment. The GUI may display a list of multiple risk assessment reports 922, 924, 926 for the same company, such as multiple risk assessment reports for different branch offices. For each assessment report, the GUI may comprise the branch office name 930, contacts 932, business owner 934, and other related information, such as review status, submit date, background check status, and the like.

Figure 10:
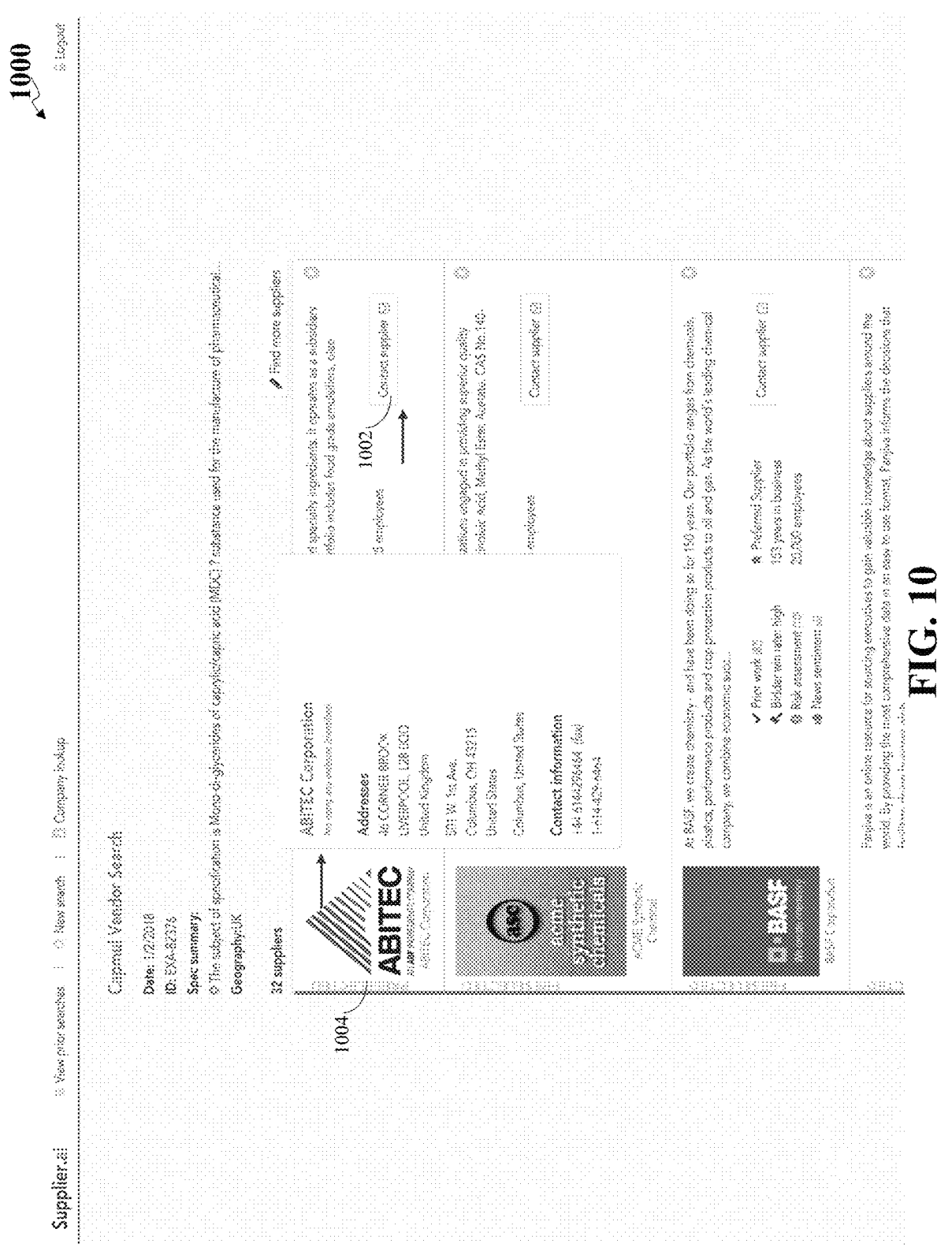

FIG. 10 illustrates an example of a graphical user interface 1000 for the client to interact with contact supplier component of a particular potential supplier, according to an embodiment. The client may interact with (e.g., click on) a graphical component of contact supplier 1002 of a particular potential supplier, such as ABITEC Corporation 1004. Upon the client interacting with the contact supplier component, the analytic server may generate a template prepopulated with information extracted from the potential supplier database. For example, the template may be an electronic email message with the receiver's email address, the title, the predetermined text string (e.g., content), and the signature prepopulated. The predetermined text string (e.g., content) may be partially filled and may be editable.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A computer-implemented method comprising:
   retrieving, by a server, a set of web documents in response to a plurality of search attribute inputs;
   generating, by the server, a set of vectors representing n-gram values corresponding to a plurality of terms within each web document;
   executing, by the server, a first artificial intelligence model configured to receive the set of vectors for each web document and generate an importance score for each web document, the importance score indicating a likelihood that the web document corresponds to a supplier rather than a non-supplier;
   executing, by the server, a second artificial intelligence model configured to:
      receive a first set of vectors corresponding to a first subset of the set of web documents satisfying an importance value threshold and generate a similarity score associated with each web document within the first subset of the set of web documents, the similarity score corresponding to a similarity between the plurality of search attribute inputs and the web document;
   selecting, by the server, a second subset of the set of web documents satisfying a similarity score threshold;

selecting, by the server, a third subset of the set of web documents satisfying a pre-determined blacklisting criteria;

generating, by the server, a graphical user interface configured to present a listing of each web document within the third subset of the set of web documents; and upon receiving a selection on the graphical user interface, generating, by the server, an electronic message directed to an address associated with at least one search attribute and containing a predetermined text string.

2. The method of claim 1, further comprising:

identifying, by the server, a fourth subset of web documents based on executing a whitelisting protocol on the third subset of the set of web documents.

3. A computer-implemented method comprising:

retrieving, by a server, a set of web documents in response to a plurality of search attributes input on a graphical user interface, wherein each web document within the set of web documents comprises at least one text string corresponding to at least one search attribute;

extracting, by the server, a set of terms from each web document;

generating, by the server, a set of vectors representing an n-gram value corresponding to a plurality of terms within the set of terms;

executing, by the server, a first artificial intelligence model configured to receive the set of vectors for each web document and generate an importance score associated with each web document, the importance score indicating a likelihood that the web document corresponds to a supplier;

executing, by the server, a second artificial intelligence model configured to:

receive a first set of vectors corresponding to a first subset of the set of web documents satisfying an importance score threshold, and generate a similarity score associated with each web document within the first subset of the set of web documents, the similarity score corresponding to a similarity between the plurality of search attributes and the web document;

executing, by the server, a blacklisting protocol configured to receive a second subset of the set of web documents that satisfy a similarity score threshold, and determine whether the second subset of the set of web documents satisfy a pre-determined blacklisting criteria;

identifying, by the server, a third subset of web documents based upon a combined value from the importance score, the similarity score, and the pre-determined blacklisting criteria;

generating, by the server, a second graphical user interface configured to present a listing of each web document within the third subset of the set of web documents; and upon receiving a selection on the second graphical user interface, generating, by the server, an electronic message directed to an address associated with at least one search attribute and containing a predetermined text string.

4. The method of claim 3, further comprising:

identifying, by the server, a fourth subset of web documents based on executing a whitelisting protocol on the third subset of the set of web documents.

5. The method of claim 3, wherein the server retrieves the set of web documents by at least one of searching a web, querying a database, and utilizing a web search application programming interface.

6. The method of claim 3, wherein the server identifies the plurality of terms within the set of terms.

7. The method of claim 3, further comprising:

displaying, by the server, the listing of each web document in the second graphical user interface based on a ranking of the similarity scores.

8. The method of claim 3, further comprising:

retrieving and aggregating, by the server, internal and external information regarding each entity corresponding to each web document within the third subset of the set of web documents; and determining, by the server, a risk score for each entity based on the internal and external information by executing another artificial intelligence model.

9. The method of claim 3, further comprising:

receiving, by the server, a request comprising a search specification; and extracting the plurality of search attributes from the search specification.

10. The method of claim 3, further comprising:

receiving, by the server, a request comprising preselected entities;

identifying, by the server, web documents of the preselected entities; and extracting, by the server, the plurality of search attributes from the web documents of the preselected entities.

11. The method of claim 3, further comprising:

displaying, by the server, web documents of preselected entities followed by web documents of other entities whose web documents have similarity scores satisfying the threshold.

12. A computer system comprising:

a client device configured to display at least one graphical user interface generated by a server; and a server in communication with the client device, the server configured to:

retrieve a set of web documents in response to a plurality of search attributes input on a graphical user interface displayed on the client device, wherein each web document within the set of web documents comprises at least one text string corresponding to at least one search attribute;

extract a set of terms from each web document;

generate a set of vectors representing an n-gram value corresponding to a plurality of terms within the set of terms;

execute a first artificial intelligence model configured to receive the set of vectors for each web document and generate an importance score associated with each web document, the importance score indicating a likelihood that the web document corresponds to a supplier rather than a non-supplier;

execute a second artificial intelligence model configured to receive a first set of vectors corresponding to a first subset of the set of web documents satisfying an importance score threshold, and generate a similarity score associated with each web document within the first subset of the set of web documents, the similarity score corresponding to a similarity between the plurality of search attributes and the web document;

execute a blacklisting protocol configured to receive a second subset of the set of web documents that satisfy a similarity score threshold, and determine whether the second subset of the set of web documents satisfy a pre-determined blacklisting criteria;

identify a third subset of web documents based upon a combined value from the importance score, the similarity score, and the pre-determined blacklisting criteria;

generate a second graphical user interface configured to present a listing of each web document within the third subset of the set of web documents; and upon receiving a selection on the second graphical user interface, generate an electronic message directed to an address associated with at least one search attribute and containing a predetermined text string.

13. The computer system of claim 12, wherein the server is further configured to:

identify a fourth subset of web documents based on executing a whitelisting protocol on the third subset of the set of web documents.

14. The computer system of claim 13, wherein the server is further configured to:

display the listing of each web document in the second graphical user interface based on a ranking of the similarity scores.

15. The computer system of claim 12, wherein the server retrieves the set of web documents by at least one of searching a web, querying a database, and utilizing a web search application programming interface.

16. The computer system of claim 12, wherein the server identifies the plurality of terms within the set of terms.

17. The computer system of claim 12, wherein the server is further configured to:

retrieve and aggregate internal and external information regarding each entity corresponding to each web document within the third subset of the set of web documents; and determine a risk score for each entity based on the internal and external information by executing another artificial intelligence model.

18. The computer system of claim 12, wherein the server is further configured to:

receive a request comprising a search specification; and extract the plurality of search attributes from the search specification.

19. The computer system of claim 12, wherein the server is further configured to:

receive a request comprising preselected entities;

identify web documents of the preselected entities; and extract the plurality of search attributes from the web documents of the preselected entities.

20. The computer system of claim 12, wherein the server is further configured to:

display web documents of preselected entities followed by web documents of other entities whose web documents have similarity scores satisfying the threshold.

* * * * *